United States Patent [19]
Yamaguchi et al.

[11] Patent Number: 6,087,760
[45] Date of Patent: Jul. 11, 2000

[54] ULTRASONIC TRANSMITTER-RECEIVER

[75] Inventors: Takeshi Yamaguchi, Osaka; Masahiro Takada, Toyohashi; Noboru Nomura, Kyoto; Osamu Kawasaki, Kyotanabe; Hirotaka Ishihara, Kosai, all of Japan

[73] Assignee: Matsushita Electric Industrial Co., Ltd., Osaka-fu, Japan

[21] Appl. No.: 08/984,200

[22] Filed: Dec. 3, 1997

[30] Foreign Application Priority Data

Apr. 21, 1997 [JP] Japan ................................. 9-103563

[51] Int. Cl.⁷ .............................. H04R 7/12; H04R 7/16; H04R 17/00
[52] U.S. Cl. ............................................. 310/334; 310/328
[58] Field of Search .................................... 310/322, 328, 310/334, 339, 369, 338

[56] References Cited

U.S. PATENT DOCUMENTS

| | | | |
|---|---|---|---|
| 2,487,962 | 11/1949 | Arndt | 310/334 |
| 3,786,202 | 1/1974 | Schafft | 310/334 |
| 4,190,783 | 2/1980 | Massa | 310/324 |
| 4,256,987 | 3/1981 | Takeuchi et al. | 310/316 |
| 4,431,873 | 2/1984 | Dunn et al. | 179/110 A |
| 4,456,849 | 6/1984 | Takayama et al. | 310/322 |
| 4,458,170 | 7/1984 | Takayama et al. | 310/322 |
| 4,486,868 | 12/1984 | Kodera et al. | 310/322 |
| 4,607,186 | 8/1986 | Takayama et al. | 310/322 |
| 5,185,728 | 2/1993 | Gilchrist | 367/163 |
| 5,304,887 | 4/1994 | Heinecke et al. | 310/369 |
| 5,446,332 | 8/1995 | Rapps et al. | 310/334 |
| 5,673,236 | 9/1997 | Barger | 310/337 |
| 5,767,612 | 6/1998 | Takeuchi et al. | 310/324 |

FOREIGN PATENT DOCUMENTS 2 361 709   10/1978   France .

Primary Examiner—Thomas M. Dougherty
Attorney, Agent, or Firm—Akin, Gump, Strauss, Hauer & Feld, L.L.P.

[57] ABSTRACT

In an ultrasonic transmitter-receiver for an apparatus for measuring the position or distance of an object, a composite vibrating unit is constructed with a piezoelectric vibrator and a cone, wherein a substantial conical vertex of the cone is connected to a center of vibration of the piezoelectric vibrator, and a node of vibration is generated on the cone at positions symmetrical about its center axis when the piezoelectric vibrator vibrates with deflection.

3 Claims, 32 Drawing Sheets

ULTRASONIC TRANSMITTER-RECEIVER

BACKGROUND OF THE INVENTION

The present invention relates to an ultrasonic transmitter-receiver to be used in a position detection apparatus or a distance measuring apparatus or the like for detecting the position or distance of an object by using ultrasonic waves.

A conventional ultrasonic transmitter will be described with reference to accompanying drawings. FIG. 34 is a side elevational view, in cross section, showing the construction of the conventional ultrasonic transmitter. In FIG. 34, a disc-shaped vibrating plate 342 made of a metal such as stainless steel is mounted with piezoelectric discs 340 and 341, one bonded to each face of the vibrating plate 342. The piezoelectric disc 341 is fixed to a base 346 by means of an elastic ring 343 which is a soft, elastic adhesive. A rod 345 for connecting a cone 344 thereto is provided on the vibrating plate 342 to which the other piezoelectric disc 340 is bonded.

As described above, the conventional ultrasonic transmitter is constructed with the piezoelectric discs 340, 341 sandwiching the vibrating plate 342 between them. The piezoelectric discs 340, 341 are arranged such that their polarizations are in the same direction. A bimorph vibration device 349 is thus constructed with the piezoelectric discs 340, 341 and the vibrating plate 342.

The cone 344, as a diaphragm held on the upper piezoelectric disc 340 via the rod 345, is a hollow conical structure made of a light metal such as aluminum. A vertex of the cone 344 is connected to one end of the rod 345, the other end of which is connected to the center of the vibrating plate 342. In this way, the bimorph vibration device 349 and the cone 344 are mechanically connected together.

In the conventional ultrasonic transmitter having the above-mentioned construction, the composite vibrating unit having the bimorph vibration device 349 and the cone 344 is constructed so that its resonant frequency coincides with a desired ultrasonic frequency. When an AC voltage is applied to the bimorph vibration device 349 in the composite vibrating unit causing the bimorph vibration device 349 to make deflective vibration, the composite vibrating unit makes vibration and an ultrasonic wave is output.

As shown in FIG. 34, the composite vibrating member consisting of the bimorph vibration device and the cone 344 is supported on the base 346 at a node of deflective vibration of the bimorph vibration device 349 via the elastic ring 343.

The conventional ultrasonic transmitter having the thus constructed bimorph vibration device is encased in a cylindrical housing 347 for enhanced protection against impact and dust. Terminal pins 348, 348' for applying a voltage to the piezoelectric discs 340, 341 and the vibrating plate 342 are provided passing through the base 346. The terminal pins 348, 348' are connected to the vibrating plate 342 and the piezoelectric discs 340, 341, respectively.

FIG. 35 is a perspective view showing the external appearance of the conventional ultrasonic transmitter provided with the housing 347. A protector 347a having a mesh structure is formed on the ultrasonic wave output side of the housing 347. The protector 347a is designed with care not to interfere with the output of ultrasonic waves.

Next, problems will be described that are encountered in the conventional ultrasonic transmitter having the above construction when increasing the sound-pressure of its output. FIG. 36 is a side view showing a vibrational displacement of an ideal cone 344a which is mounted on a piezoelectric vibrator, a bimorph vibration device, in order to increase the output of the ultrasonic sound-pressure. In FIG. 36, an alternate long and short dash line 360 indicates the stationary position of the cone 344a before the piezoelectric vibrator is excited into vibration, and a solid line 361 and a dashed line 362 respectively show the upper-end and lower-end positions of the ideal cone 344a when the piezoelectric vibrator is excited into vibration in an ideal condition. In FIG. 36, arrow A indicates the displacement direction of the deflective vibration of the piezoelectric vibrator. As shown in FIG. 36, the ideal cone 344a vibrates linearly in directions parallel to the displacement direction A of the deflective vibration.

To achieve increased output of ultrasonic sound-pressure, it is desirable that the cone 344a move linearly in reciprocating fashion in parallel with the displacement direction (the direction indicated by arrow A) of a deflective vibration of the piezoelectric vibrator by the deflective vibration of the piezoelectric vibrator. In actuality, however, the cone 344 does not move linearly in reciprocating fashion in parallel with the displacement direction of the deflective vibration when it makes vibration with a large amplitude. Possible causes are: the cone 344 is not made so as to be symmetrical about its conical center axis, or the cone 344 and the piezoelectric vibrator are not connected together precisely at their respective centers.

FIG. 37 is a side view showing one example of a vibrational displacement of a practical cone 344b when outputting an ultrasonic sound-pressure. As shown in FIG. 37, when actually outputting an ultrasonic sound-pressure, the deflective vibration of the piezoelectric vibrator is transmitted to the conical surface of the cone 344b and the cone 344b wobbles with its center axis swaying left and right. In FIG. 37, the left/right swaying motion is greatly exaggerated. As a result of the left/right sawing motion, the output of the sound-pressure of the cone 344b becomes smaller than its design value.

In FIG. 37, an alternate long and short dash line 370 indicates the position of the conical surface of the conventional cone 344b before the piezoelectric vibrator is excited into vibration, and solid line 371 and dashed line 372 respectively show the rightmost and leftmost positions of the conical surface of the cone 344b when the piezoelectric vibrator is excited into vibration. In FIG. 37, the direction indicated by arrow A is the displacement direction of the deflective vibration of the piezoelectric vibrator. As shown in FIG. 37, the rod 345 connecting the cone 344b to the piezoelectric vibrator receives bending moment forces very many times from directions other than the displacement direction of the deflective vibration (the direction indicated by arrow A). Therefore, the deflective vibration of the cone 344b cannot be made large in the displacement direction A. As a result, the rod 345 becomes fatigued, and its mechanical strength decreases, sometimes resulting in the breakage of the rod 345.

To prevent the rod 345 from breaking as described above, it has been practiced to increase the diameter of the rod 345 to increase the mechanical strength of the rod 345 against bending moment. Such construction, however, has lead to the problem that load for the deflective vibration of the piezoelectric vibrator increases, making it difficult to increase sound-pressure output.

Generally, an ultrasonic transmitter and an ultrasonic receiver are identical in construction. Accordingly, when deflective vibrations as described above occur in the ultrasonic receiver, the cone does not vibrate linearly along the designed deflection direction when an ultrasonic wave is received; this has lead to the problem that noise other than the received ultrasonic wave tends to occur and the receiving sensitivity to the incident ultrasonic wave tends to drop.

Next, a conventional ultrasonic transmitter, of which a horn is mounted on the above-described composite vibrating unit consisting of the piezoelectric vibrator and the cone, will be described with reference to drawings.

FIG. 38 is a side elevational view, in cross section, showing the construction of the conventional ultrasonic transmitter equipped with a horn.

The ultrasonic transmitter shown in FIG. 38 is constructed by mounting a conical-shaped horn 380 on the composite vibrating unit consisting of the bimorph vibration-device 349 and the cone 344 shown in FIG. 34. The cone 344, as a diaphragm held on the piezoelectric disc 340 via the rod 345, is a hollow conical structure made of a light metal such as aluminum. The vertex of the cone 344 is connected to one end of the rod 345, the other end of which is connected to the center of the vibrating plate 342. In this way, the bimorph vibration device 349 and the cone 344 are mechanically connected together.

In FIG. 38, reference numeral 381 indicates the position of the vibration node of the cone 344. The composite vibrating unit consisting of the bimorph vibration device 349 and the cone 344 is elastically connected to the base 346 at an open end of the cone 344 (the upper end of the cone 344 in FIG. 38) via an elastic ring 343 which is a soft adhesive. Accordingly, the piezoelectric discs 340, 341 and the electrode portions of the terminal pins 348 located inside the base 346 are protected against water drops and dust.

The ultrasonic transmitter shown in FIG. 38 has a soft and vibration absorbing material such as a sponge which is filled in the space enclosed by the bimorph vibration device 349 and the base 346, thereby preventing the vibration of the composite vibrating unit consisting of the bimorph vibration device 349 and the cone 344 from being transmitted to the base 346, while at the same time providing protection against mechanical shock.

In the conventional ultrasonic transmitter having the above construction, the horn 380 and the base 346 are connected together so that the center axis of the conical-shaped horn 380 coincides with the center axis of the cone 344.

As described above, in the conventional ultrasonic transmitter having the horn 380, the open end edge of the cone 344 is bonded to the base 346 using the elastic ring 343. As a result, when an AC voltage is applied to the bimorph vibration device 349, causing the bimorph vibration device 349 to make the deflective vibration, a vibration having a node 381 is set up on the conical surface of the cone 344. The ultrasonic wave emitted from the composite vibrating unit having the above-described structure propagates through the interior space of the conical-shaped horn 380 and is radiated into free space through a mouth 380a which is the opening of the horn 380.

Next, a description will be given of how the ultrasonic wave emitted from the inside surface of the cone 344 propagates inside the conical-shaped horn 380. FIG. 39 is a phase distribution curve diagram simulating the ultrasonic wave propagating inside the conical-shaped horn 380 in the conventional ultrasonic transmitter. In FIG. 39, reference numeral 393 indicates the center axis of the horn 380. Since the phase distribution of the ultrasonic wave is symmetrical between the right half and left half about the center axis 393 of the conical-shaped horn 380, the ultrasonic wave phase distribution curve diagram of FIG. 39 shows one half of the conical-shaped horn 380 divided along its center axis 393, and the right half is omitted.

In FIG. 39, the curved stripe patterns show in-phase propagation of the ultrasonic wave. A reference numeral 390 indicates the conical surface of the cone 344, a reference numeral 391 shows the inside surface of the conical-shaped horn 380, and a reference numeral 392 is an imaginary baffle assumed at the mouth 380a of the horn 380. In this simulation, vibrations other than those from the conical surface 390 of the cone 344 is excluded by the presence of the baffle 392.

As shown in FIG. 39, the phase of the ultrasonic wave propagating inside the conical-shaped horn 380 is disturbed near the conical surface 390 of the cone 344. However, if the horn length along the center axis of the horn 380 is sufficiently large, phase discontinuities of the ultrasonic wave, which are caused by displacements opposite in phase across the vibration node of the cone 344, appear in a region near the conical surface 391 of the horn 380 and in a distance from the center axis 393 of the conical-shaped horn 380. Near the center axis 393 of the conical-shaped horn 380, the ultrasonic wave have substantially the same phase in a plane perpendicular to the center axis 393 of the horn 380. The sound-pressure directivity pattern of the above conventional ultrasonic transmitter becomes narrow when the size of the opening of the mouth 380a of the horn 380 is increased, and becomes broad when the opening is reduced. In this way, in the conventional ultrasonic transmitter, the sound-pressure directivity has greatly depended on the size of the mouth 380a of the conical-shaped horn 380.

FIG. 40 is a diagram in a polar coordinate system. FIG. 40 shows the relationship between the angle relative to the center axis 393 of the horn 380 and the sound-pressure of the output ultrasonic wave, when observed at a point a given distance away from the mouth 380a of the conical-shaped horn 380 for the above-configured conventional ultrasonic transmitter having a long horn. Here, the frequency was 40 kHz, the horn length was 120 mm, and the distance from the mouth 380a to the observation point was 300 mm.

As shown in FIG. 40, the conventional ultrasonic transmitter achieves some degree of ultrasonic wave directivity by providing a large conical-shaped horn 380. This means that the provision of the large conical-shaped horn 380 was essential in the conventional ultrasonic transmitter if some degree of ultrasonic wave directivity was to be achieved.

Next, a conventional ultrasonic transmitter of a drip-proof type will be described with reference to drawings. FIG. 41 is a side elevational view, in cross section, showing the construction of the conventional drip-proof type ultrasonic transmitter.

The word "drip-proof" is used in the meaning as described in IEEE Standard Dictionary of Electrical and Electronics Terms (Fourth Edition) published by The Institute of Electrical and Electronics Engineers, Inc New York, N.Y. in 1998. That is "so constructed or protected that successful operation is not interfered with when falling drops of liquid or solid particles strike or enter the enclosure at any angle from 0 to 15 degrees from the downward vertical unless otherwise specified."

As shown in FIG. 41, the conventional drip-proof type ultrasonic transmitter comprises a piezoelectric disc 410, a disc-shaped piezoelectric element, which is attached to an inside face of the bottom of a bowl-shaped metal vibrating plate 411. Two terminal pins 413 and 414 are provided passing through a base 412 which is attached so as to close the opening of the metal vibrating plate 411. In the conventional drip-proof type ultrasonic transmitter, a conical face part 415 is formed in the upper part of the side portion of the metal vibrating plate 411, as shown in FIG. 41.

In FIG. 41, electrodes are formed on both principal faces, i.e., the upper and lower faces, of the piezoelectric disc 410, and the upper face of the piezoelectric disc 410 is fixed to the inside face of the metal vibrating plate 411 in electrically conducting relationship. The metal vibrating plate 411, to which the piezoelectric disc 410 is cemented, is made of a high rigidity metallic material such as stainless steel.

The terminal pin 413 is electrically connected to the metal vibrating plate 411, while the other terminal pin 414 is electrically connected to the electrode on the lower face of the piezoelectric disc 410. When an AC voltage of an ultrasonic frequency is applied to these terminal pins 413, 414, the piezoelectric disc 410 vibrates at the ultrasonic frequency; this vibration is transmitted to the metal vibrating plate 411, and thus the drip-proof type ultrasonic transmitter outputs an ultrasonic wave.

The thus constructed conventional drip-proof type ultrasonic transmitter has a hermetically sealed structure in which the piezoelectric disc 410 is enclosed by the metal vibrating plate 411 and the base 412. With this hermetically sealed structure, the electrode faces of the piezoelectric disc 410 are protected from the outside environment, and the drip-proof type ultrasonic transmitter is thus provided with a drip-proof capability.

FIG. 42 is a side elevational view, in cross section, conceptually showing the conventional drip-proof type ultrasonic transmitter in the condition of a vibrational displacement. The magnitude of the sound-pressure output of the drip-proof type ultrasonic transmitter is determined by the displacement volume (the volume that the deflected space displaces) of the vibrating portion of the metal vibrating plate 411 when it makes vibration. Accordingly, to increase the sound-pressure output of the drip-proof type ultrasonic transmitter, the amount of deflective displacement of the metal vibrating plate 411 must be made as large as possible.

In view of this, the conventional drip-proof type ultrasonic transmitter has been constructed so as to increase the amplitude of the face of the metal vibrating plate 411 to which the piezoelectric disc 410 is bonded, by forming the conical face part 415 in the upper part of the side portion of the metal vibrating plate 411, as shown in FIG. 41.

The conventional drip-proof type ultrasonic transmitter having the above construction has been manufactured by forming the metal vibrating plate, for example, by stamping, and by bonding the piezoelectric disc to the thus formed metal vibrating plate.

In the thus constructed conventional ultrasonic transmitter-receiver, the cone and the piezoelectric vibrator have had to be securely connected together precisely at a predetermined position, and in the case of the ultrasonic transmitter, it has not been possible to increase the sound-pressure output unless the two members are connected together precisely in position. In the case of the ultrasonic receiver, failing to do this has resulted in an ill effect on the receiving sensitivity.

Furthermore, to increase sound-pressure output or achieve sharp directivity in the conventional ultrasonic transmitter equipped with a horn, or to increase the receiver sensitivity in the conventional ultrasonic receiver equipped with a horn, it has been necessary to use a large-size horn, the resulting problem being that the conventional ultrasonic transmitter-receiver increase in size.

In the conventional drip-proof type ultrasonic transmitter to achieve a further increase in sound-pressure output, it has been necessary to further increase the area of the vibrating face. Also, to produce vibration at the desired ultrasonic frequency in the resonant mode of the above-described structure in order to obtain a large output, the thickness of the vibrating portion of the metal vibrating plate has had to be increased in accordance with an increase in the area of the vibrating portion.

Increasing the thickness of the vibrating portion of the metal vibrating plate, however, has involved the following problems:

(1) The rigidity of the vibrating portion increases, as a result of which the amount of deflective displacement cannot be made large; and (2) The metal vibrating plate cannot be manufactured by simple and inexpensive metal forming means such as stamping.

The present invention resolves the above-enumerated problems of the conventional ultrasonic transmitter, and it is an object of the present invention to provide an ultrasonic transmitter-receiver capable of producing large sound-pressure output, or an ultrasonic receiver capable of increasing receiving sensitivity.

It is another object of the present invention to provide an ultrasonic transmitter achieving a large sound-pressure output and sharp directivity with a small-size horn, or an ultrasonic receiver achieving sharp directivity with a small-size horn.

It is a further object of the present invention to provide a drip-proof type ultrasonic transmitter capable of producing large sound-pressure output, a drip-proof type ultrasonic receiver having a high receiving sensitivity.

BRIEF SUMMARY OF THE INVENTION

In order to achieve the above-mentioned objects, an ultrasonic transmitter-receiver of the present invention comprises:

a piezoelectric vibrating member having electrodes to be supplied with or outputting therefrom a signal of an ultrasonic frequency; and a diaphragm having a cone of a hollow conical structure, the cone having a node of vibration at positions symmetrical about a center axis thereof and a substantial conical vertex of the cone is connected to a center of vibration of the piezoelectric vibrating member.

Therefore, the ultrasonic transmitter-receiver of the present invention can provide an ultrasonic transmitter capable of producing large sound-pressure output, or an ultrasonic receiver capable of increasing receiving sensitivity.

An ultrasonic transmitter-receiver of the present invention comprises:

a piezoelectric vibrating member having electrodes to be supplied with or outputting therefrom a signal of an ultrasonic frequency;

a diaphragm having a cone of a hollow conical structure, the cone having a node of vibration at positions symmetrical about a center axis thereof and a substantial conical vertex of the cone is connected to a center of vibration of the piezoelectric vibrating member, the piezoelectric vibrating member and the diaphragm together constituting a composite vibrating unit;

a housing, separated by a predetermined distance from an open end edge of a conical base of the cone, accommodating therein a composite vibrating unit, and elastically supporting the piezoelectric vibrating member thereon; and a film member, provided in such a manner as to connect between the open end edge of the cone and the housing, for applying substantially uniform tension in radial directions around the center axis of the cone Therefore, the ultrasonic transmitter-receiver of the present invention can provide an ultrasonic transmitter capable of producing large sound-pressure output, or an ultrasonic receiver capable of increasing receiving sensitivity A vibrating member for an ultrasonic transmitter-receiver of the present invention comprises:

a piezoelectric element having electrodes to be supplied with or outputting therefrom a signal of an ultrasonic frequency;

a vibrating cylinder which has a cylindrical structure closed with an upper base wall at one end and opened at the other end, wherein the piezoelectric element is fixedly attached to the upper base wall and a portion surrounding a portion where the piezoelectric element is fixedly attached is formed thinner than the portion where the piezoelectric element is fixedly attached;

a base for closing the open end of the vibrating cylinder; and terminals provided passing through the base and electrically connected to the electrodes of the piezoelectric element.

Therefore, the vibrating member for an ultrasonic transmitter-receiver of the present invention can provide a drip-proof type ultrasonic transmitter capable of producing large sound-pressure output, a drip-proof type ultrasonic receiver having a high receiving sensitivity.

An ultrasonic transmitter-receiver of the present invention comprises:

a piezoelectric vibrating member having electrodes to be supplied with or outputting therefrom a signal of an ultrasonic frequency;

a diaphragm having a cone of a hollow conical structure, and connected to a center of vibration of the piezoelectric vibrating member at a substantial conical vertex of the cone, and the piezoelectric vibrating member and the diaphragm together constituting a composite vibrating unit;

a housing, forming an opening separated by a predetermined distance from an open end edge of a conical base of the cone, accommodating therein a composite vibrating unit, and elastically supporting the piezoelectric vibrating member thereon.

Therefore, the ultrasonic transmitter-receiver of the present invention can provide an ultrasonic transmitter capable of producing large sound-pressure output, or an ultrasonic receiver capable of increasing receiving sensitivity.

An ultrasonic transmitter of the present invention comprises:

a piezoelectric vibrating member having electrodes for outputting therefrom a signal of an ultrasonic frequency;

a diaphragm having a cone of a hollow conical structure, the cone having a node of vibration at positions symmetrical about a center axis thereof and a substantial conical vertex of the cone is connected to a center of vibration of the piezoelectric vibrating member, the piezoelectric vibrating member and the diaphragm together constituting a composite vibrating unit;

a housing, forming an opening separated by a predetermined distance from an open end edge of a conical base of the cone, accommodating therein the composite vibrating unit, and elastically supporting the piezoelectric vibrating member thereon; and a horn whose throat is connected to the opening of the housing, the horn forming a space spreading from the opening toward a distal end.

Therefore, the ultrasonic transmitter of the present invention can produce a large sound-pressure output and sharp directivity with a small-size horn.

An ultrasonic transmitter of the present invention comprises:

a piezoelectric vibrating member having electrodes for outputting therefrom a signal of an ultrasonic frequency;

a diaphragm having a cone of a hollow conical structure, the cone having a node of vibration at positions symmetrical about a center axis thereof and a substantial conical vertex of the cone is connected to a center of vibration of the piezoelectric vibrating member: and a base for elastically supporting thereon a composite vibrating unit having the piezoelectric vibrating member and the diaphragm, and wherein:

the distance from the open end edge of the cone to the composite vibrating unit, measured in a direction parallel to the center axis of the cone, is equal to an integral multiple of the wavelength of an output ultrasonic wave.

Therefore, the ultrasonic transmitter of the present invention can produce large sound-pressure output.

An ultrasonic transmitter of the present invention comprises:

a piezoelectric vibrating member having electrodes for outputting therefrom a signal of an ultrasonic frequency;

a diaphragm having a cone of a hollow conical structure, wherein a substantial conical vertex of the cone having a node of vibration at positions symmetrical about a center axis thereof is connected to a center of vibration of the piezoelectric vibrating member; and a base for elastically supporting thereon a composite vibrating unit having the piezoelectric vibrating member and the diaphragm, and wherein:

the distance from the open end edge of the cone to an upper face of the base, measured along a perpendicular dropped from the upper face to the open end edge, is equal to an integral multiple of the wavelength of an output ultrasonic wave.

Therefore, the ultrasonic transmitter of the present invention can produce large sound-pressure output.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Embodiment 1

An ultrasonic transmitter as a first embodiment of the ultrasonic transmitter-receiver of the present invention will be described below with reference to FIGS. 1A to 3.

Figure 1A:
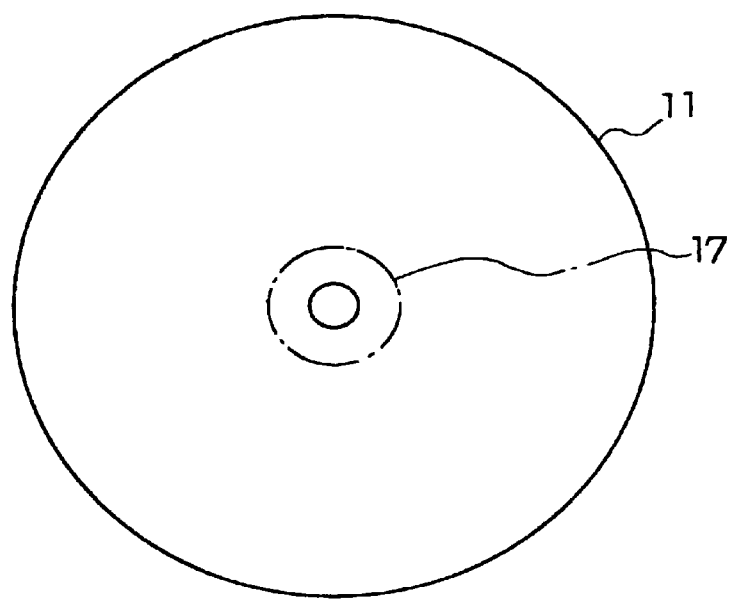
FIG. 1A is a top plan view of an ultrasonic transmitter according to a first embodiment of the present invention.
Figure 1B:
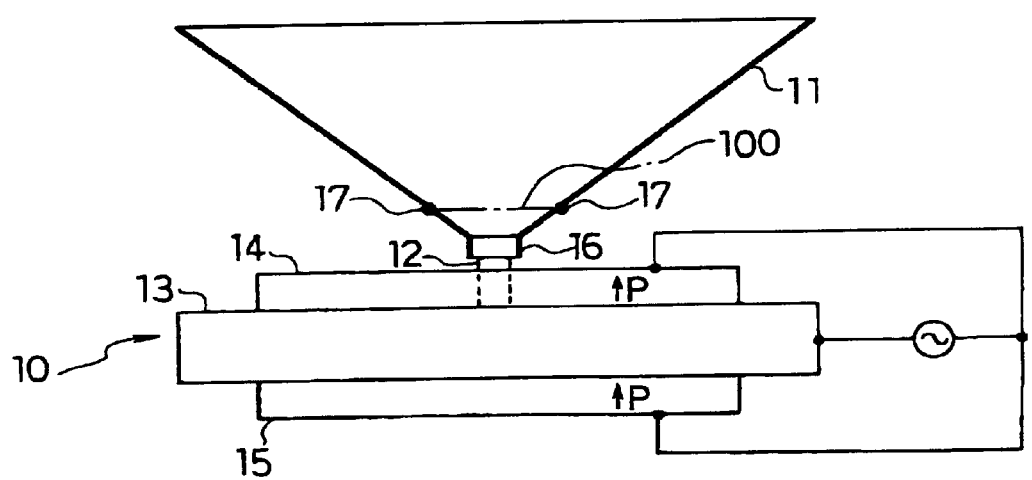
FIG. 1B is a side view showing a construction of the ultrasonic transmitter according to the first embodiment.

FIG. 1A is a top plan view of the ultrasonic transmitter according to the first embodiment of the present invention, and FIG. 1B is a side view showing the construction of the ultrasonic transmitter according to the first embodiment.

In FIGS. 1A and 1B, piezoelectric discs 14, 15 each having a hole opened through the center thereof, are bonded to opposite faces of a disc-shaped vibrating plate 13 made of a metal such as stainless steel. The piezoelectric discs 14, 15 are arranged in such a manner that their polarizations P are in the direction and magnitude as shown by arrow P in the FIG. 1B. A rod 12 for connecting a cone 11 thereto is provided on the surface of the vibrating plate 13 where the piezoelectric disc 14 is fixedly attached.

A piezoelectric vibrator 10 is constructed by bonding the piezoelectric discs 14, 15 to the opposite faces of the vibrating plate 13, as described above, thus forming a bimorph vibration device.

The cone 11 mounted on the upper piezoelectric disc 14 is a vibrator of a hollow conical structure made of a light metal such as aluminum.

As shown in FIG. 1B, the bottom of a protrusion 16 located at the conical vertex of the cone 11 is connected to one end of the rod 12, and the other end of the rod 12 is connected to the center of one surface of the vibrating plate 13 through the center hole in the piezoelectric disc 14. In this way, the piezoelectric vibrator 10 as the bimorph vibration device and the cone 11 are mechanically and securely connected together.

In the above-mentioned ultrasonic transmitter, the natural frequency of deflective vibration of the bimorph vibration device is of a frequency in the ultrasonic frequency range. Electrodes are formed over the entire regions of the principal faces of the piezoelectric discs 14, 15 (the upper and lower faces of the piezoelectric discs 14 and 15 in FIG. 1B). When an AC voltage is applied to the thus constructed piezoelectric vibrator 10, causing the piezoelectric vibrator 10 to make the deflective vibration, the composite vibrating unit consisting of the piezoelectric vibrator 10 and the cone 11 makes vibration and an ultrasonic wave is output.

When the piezoelectric vibrator 10 deflects and vibrates at a specified frequency, a node 17 of vibration is generated on the conical surface of the cone 11 near the conical vertex thereof. This node 17 of vibration, as shown by an alternate long and short dash line 100, is generated in a ring shape produced in symmetry around the center axis of the cone 11.

Next, the operation of the above-mentioned ultrasonic transmitter of the first embodiment will be described.

First, an AC voltage is applied to the bimorph vibration device to excite the piezoelectric vibrator 10 into deflective vibration. When the piezoelectric vibrator 10 makes deflective vibration, the cone 11 connected to the piezoelectric vibrator 10 vibrates in the direction parallel to the center axis of the cone 11 at the frequency of the deflective vibration. At this time, the ring-shaped node 17 of vibration the conical surface of the cone 11.

Figure 2:
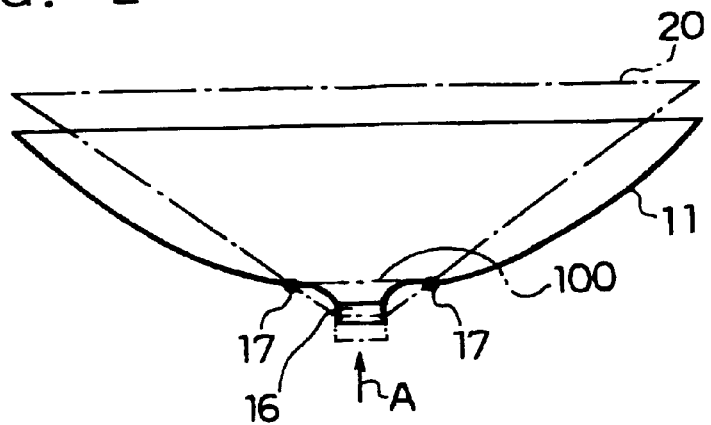
FIG. 2 is a side elevational view, in cross section, showing a cone set into vibration with a deflective vibration of a piezoelectric vibrator.

FIG. 2 is a side elevational view, in cross section, showing the cone 11 set into vibration with the deflective vibration of the piezoelectric vibrator 10. In FIG. 2, alternate long and short dash line 20 shows in a somewhat exaggerated form the position of the conical surface of the cone 11 at a certain instant in time when the piezoelectric vibrator 10 Is in the quiescent condition before it makes deflective vibration. A solid line 21 indicates in a somewhat exaggerated form of the position of the conical surface of the cone 11 at a certain instant in time when the piezoelectric vibrator 10 makes deflective vibration. In FIG. 2, arrow A shows the displacement direction of the vibration applied to the cone 11 by the deflective vibration of the piezoelectric vibrator 10.

As shown in FIG. 2, the node 17 of vibration is generated at positions symmetrical about the conical center axis of the cone 11. As a result, the conical surface of the cone 11 is displaced such that the displacement on the vertex side of the node 17 of vibration is opposite in phase from the displacement on the opposite side of the node 17 of vibration. The whole structure of the cone 11 deflects symmetrically about the center axis of the cone. As a result, the protrusion 16 formed at the vertex of the cone 11 vibrates linearly in directions parallel to the displacement direction (direction A in FIG. 2) of the deflective vibration of the piezoelectric vibrator 10. Since each part of the cone 11 vibrates greatly in rectilinear fashion in directions parallel to the direction of arrow A because of the deflective vibration of the piezoelectric vibrator 10, an ultrasonic wave having a large sound-pressure is produced.

Further, since the vibration node of the cone 11 such a manner as to be symmetrical about the center axis passing through the rod 12, and the rod 12 connected to the protrusion 16 of the cone 11 has a large diameter, the rod 12 does not exhibit appreciable bending, but vibrates only in its axial direction i.e. in the deflective vibration. Therefore, the rod 12 does not receive the bending moment of forces from directions other than the displacement directions of the deflective vibration. As a result, in the ultrasonic transmitter of the first embodiment, there is no possibility of breaking of the rod 12 breaking due to the deflective vibration of the piezoelectric vibrator 10, and therefore, there is, therefore, no need to provide a rod 12 having a large mechanical strength.

Figure 3:
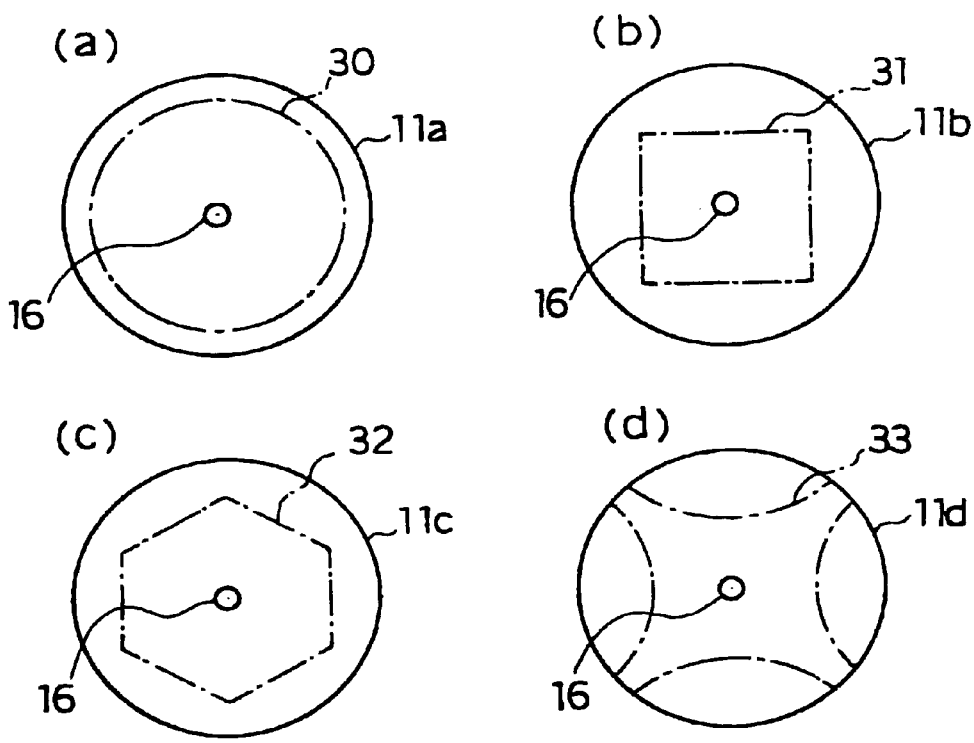
FIG. 3 shows plan views (a–d) each illustrating a cone as viewed from above.

Another example of forming vibration nodes at positions symmetrical with respect to the center axis of the cone will be described below. FIG. 3 shows plan views each illustrating a cone as viewed from above. In FIG. 3, alternate long and short dash lines 30, 31, 32, and 33 show vibration nodes.

The cone 11a shown in part (a) of FIG. 3 has a ring shaped node 30 of vibration produced in symmetry around the center axis of the cone, this node 30 of vibration is generated near the open end edge of the conical base of the cone 11a.

The cone 11b shown in part (b) of FIG. 3 has a node 31 of vibration of a square shape. A node 32 of vibration of an equiangular hexagonal shape the cone 11c shown in part (c) of FIG. 3, while a node 33 of vibration of a curved shape the cone 11d shown in part (d) of FIG. 3. In the ultrasonic transmitter of the present invention, the vibration node generated on the cone may be of any shape as long as the node is generated at positions symmetrical about the center axis of the cone.

The shape of the vibration node generated on the cone 11, including those shown in FIG. 3, is set by the vibration mode of the natural frequency of the cone 11 which is determined by the size and shape of the cone 11. Accordingly, by making the resonant frequency of the deflective vibration of the piezoelectric vibrator 10 coincide with the natural frequency of the cone 11, the sound-pressure output of the ultrasonic transmitter can be increased.

Since the node of vibration is generated at positions symmetrical about the conical center axis of the cone 11 as illustrated above, the cone 11 in the first embodiment vibrates substantially linearly in directions parallel to the conical center axis of the cone and symmetrically about that center axis.

Here, it is preferable that the vibration node generated symmetrically about the conical center of the cone 11 is generated near the conical vertex or the open end of the cone 11, as shown in FIG. 2 or the part (a) of FIG. 3, rather than near the center part of the conical surface of the cone 11 between the open end and its center. According to an experiment, by forming the vibration node in this way, the space displacement volume due to the vibration of the cone increases, which contributes to increasing the sound-pressure output of the ultrasonic transmitter of the first embodiment.

In an ultrasonic receiver which has the same structure as the above-described ultrasonic transmitter, when an ultrasonic wave vibration is given, the cone of the ultrasonic receiver vibrates linearly in the directions parallel to the center axis of the cone and symmetrically about that center axis; this increases receiving sensitivity and permits detection of a very small sound-pressure.

In the first embodiment, the piezoelectric vibrator 10 has a bimorph structure, but it will be appreciated that similar effects as those in the first embodiment can also be achieved when such a unimorph structure, which comprises a single piezoelectric disc and a metal vibrating plate bonded together, is used.

As described above, according to the first embodiment, since the cone 11 is formed so as to have a node of vibration at positions symmetrical about the center axis of the cone 11, the cone 11 vibrates linearly along and symmetrically about the center axis of the cone 11, responding to the deflective vibration of the piezoelectric vibrator 10. This contributes to increasing the sound-pressure output of the ultrasonic transmitter and enhancing the receiving sensitivity of the ultrasonic receiver.

Embodiment 2

An ultrasonic transmitter as a second embodiment of the ultrasonic transmitter-receiver of the present invention will be described below with reference to FIGS. 4A to 5.

Figure 4A:
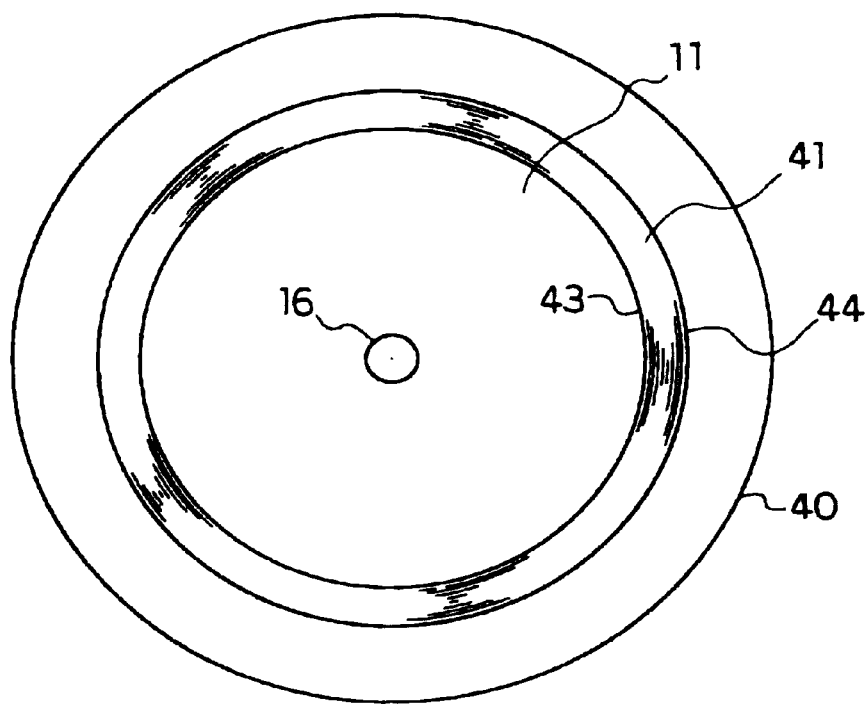
FIG. 4A is a plan view of an ultrasonic transmitter according to a second embodiment of the present invention.
Figure 4B:
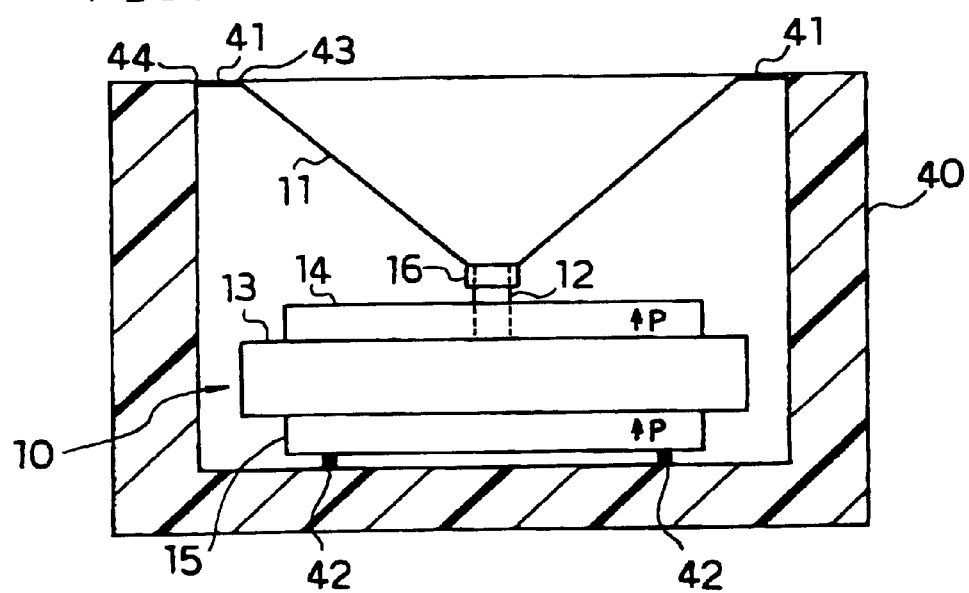
FIG. 4B is a side elevational view, in cross section, showing a construction of the ultrasonic transmitter of FIG. 4A.
Figure 5:
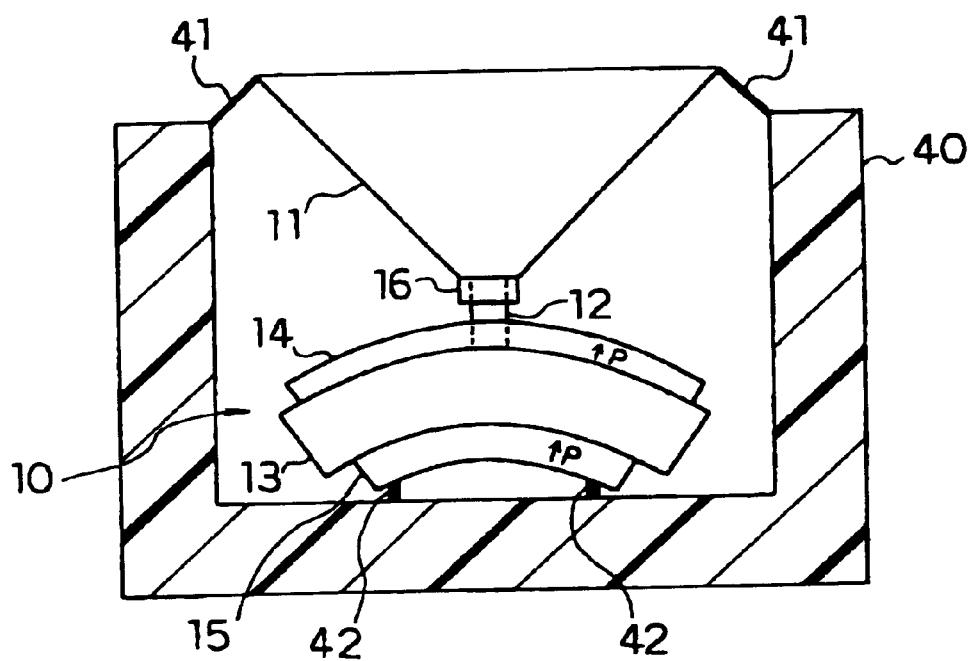
FIG. 5 is a cross-sectional view conceptually illustrating a vibrating condition of the ultrasonic transmitter of the second embodiment.

FIG. 4A is a plan view of the ultrasonic transmitter of the second embodiment of the present invention, and FIG. 4B is a side elevational view, in cross section, showing the construction of the ultrasonic transmitter of FIG. 4A. In the second embodiment, those parts which are substantially the same in function and construction as the corresponding parts in the first embodiment are designated by the same reference numerals as those used in the first embodiment, and superposed explanations thereon are omitted.

In FIGS. 4A and 4B, the piezoelectric vibrator 10 comprises of a disc-shaped vibrating plate 13 made of a metal such as stainless steel and piezoelectric discs 14, 15 bonded to opposite faces of the vibrating plate 13. The piezoelectric discs 14, 15 are arranged in such a manner that their polarizations become equal in direction and magnitude as shown by arrow P in FIG. 4B. A rod 12 for connecting a cone 11 thereto is provided on the surface of the vibrating plate 13 where the piezoelectric disc 14 is fixedly attached.

The piezoelectric vibrator 10 is constructed by bonding the piezoelectric discs 14, 15 to the vibrating plate 13, as described above, thus forming a bimorph vibration device.

The cone 11, as a diaphragm held on the piezoelectric disc 14 via the rod 12, is a hollow conical structure made of a light metal such as aluminum.

As shown in FIG. 4B, the protrusion 16 located at the conical vertex of the cone 11 is connected to one end of the rod 12, the other end of which is connected to the center of the vibrating plate 13.

The composite vibrating unit consisting of the thus constructed piezoelectric vibrator 10 and cone 11 is accommodated in a cylindrical housing 40 having a closed bottom. The composite vibrating unit is supported in the housing 40 by means of an annular support 42 which is made of a soft adhesive, for example, a silicone rubber based adhesive. This composite vibrating unit is elastically supported by the support 42 at the position corresponding to the node of deflective vibration of the piezoelectric vibrator 10.

As shown in FIGS. 4A and 4B, the open end edge 43 of the cone 11 is connected to the open end edge 44 of the housing 40 via a ring-shaped film 41 which is an elastic member. The cone 11 is held stretched across the open end edge 44 of the housing 40 with a uniform radial tension applied to the cone 11 by the ring-shaped film 41 around the entire circumference of its open end edge 43.

In the above-mentioned ultrasonic transmitter, the natural frequency of deflective vibration of the bimorph vibration device is chosen to be in the ultrasonic frequency range. Electrodes are formed over the entire regions of the principal faces of the piezoelectric discs 14, 15 (the upper and lower faces of the piezoelectric discs 14, 15 in FIG. 4B). When an AC voltage is applied to the thus constructed bimorph vibration device causing the bimorph vibration device to make the deflective vibration, the composite vibrating unit consisting of the piezoelectric vibrator 10 and the cone 11 makes vibration and an ultrasonic wave is output.

As described above, the housing 40 supports the open end edge 43 of the cone 11 by the radially stretching uniform tension of the ring-shaped film 41. The method of applying the tension to the cone 11 as described above utilizes the thermal expansion characteristic of the film 41 made of a silicone rubber based material, as described below.

First, the film 41 is bonded by adhesive to the open end edge 43 of the cone 11 around the entire circumference thereof. Next, using a thermosetting adhesive, the film 41 is bonded to the open end edge 44 of the housing 40. When bonding the film 41 to the housing 40, heat is applied to cure the adhesive at a temperature higher than that used when bonding the film 41 to the cone 11. By curing the adhesive by heat in this way, the film 41 is stretched outward in radial directions of the open end edge 43 of the cone 11 uniformly around the entire circumference of the film 41. As a result, the open end edge 43 of the cone 11 is tensioned in radial directions of base of the cone.

In operation, the ultrasonic transmitter of the second embodiment is the same as the foregoing first embodiment. FIG. 5 is a cross-sectional view conceptually illustrating a vibrating condition of the ultrasonic transmitter of the second embodiment. As shown in FIG. 5, ideally the cone 11 vibrates substantially linearly in direction of the deflective vibration of the piezoelectric vibrator 10. More specifically, since the cone 11 in the second embodiment is uniformly tensioned around the entire circumference of its open end 43, the cone 11 vibrates substantially linearly in directions parallel to the center axis of the cone, exhibiting vibrational displacements rotation-symmetrical about that center axis. Accordingly, in the ultrasonic transmitter of the second embodiment, it becomes possible to suppress vibrations in directions other than those parallel to the center axis of the cone 11, for example, vibrations due to the bending moment in directions perpendicular to the center axis.

By forming the node of vibration at the desired position in the ultrasonic transmitter of the second embodiment, as illustrated in the foregoing first embodiment, the ultrasonic wave output of the ultrasonic transmitter of the second embodiment can be further increased.

The ultrasonic transmitter of the second embodiment has a structure excellent in drip-proof sealed in a space since the piezoelectric vibrator 10 is surrounded by the housing 40, the cone 11, and the film 41.

Also in an ultrasonic receiver, by having the same structure as that of the ultrasonic transmitter of the second embodiment, when an ultrasonic wave is incident the cone of the ultrasonic receiver vibrates linearly along and symmetrically about the center axis of the cone; this increases receiving sensitivity and permits detection of a very small sound-pressure.

In the second embodiment, the piezoelectric vibrator 10 has a bimorph structure, but it will be appreciated that similar effects as those in the second embodiment can also be achieved when such a unimorph structure, which comprises a single piezoelectric disc and a metal vibrating plate bonded together, is used.

As described above, according to the second embodiment, the composite vibrating unit consisting of the piezoelectric vibrator 10 and the cone 11 is accommodated in the housing 40. And the open end edge of the cone 11 is connected to the open end edge 44 of the housing 40 via the film 41 uniformly around the entire circumference thereof, and uniformly tensioned around the entire circumference of the film 41 in radial directions of the conical base of the cone 11. Accordingly, the node of vibration is generated on the cone 11 at positions symmetrical about the center axis thereof. As a result, in the ultrasonic transmitter of the second embodiment, with the deflective vibration of the piezoelectric vibrator 10 the cone 11 vibrates substantially linearly in the directions of the center axis of the cone and rotation-symmetrically about that center axis. According to the second embodiment, the piezoelectric vibrator 10 can have a drip-proof structure, and at the same time, the sound-pressure output of the ultrasonic transmitter can be increased and the receiving sensitivity of the ultrasonic receiver enhanced.

In the second embodiment, the piezoelectric vibrator 10 has been described as being supported by the support made of a soft adhesive at the node of deflective vibration of the piezoelectric vibrator, but instead, the piezoelectric vibrator 10 may be placed on a soft, elastic material such as a cotton.

Embodiment 3

An ultrasonic transmitter as a third embodiment of the ultrasonic transmitter-receiver of the present invention will be described below with reference to FIGS. 6A and 65.

Figure 6A:
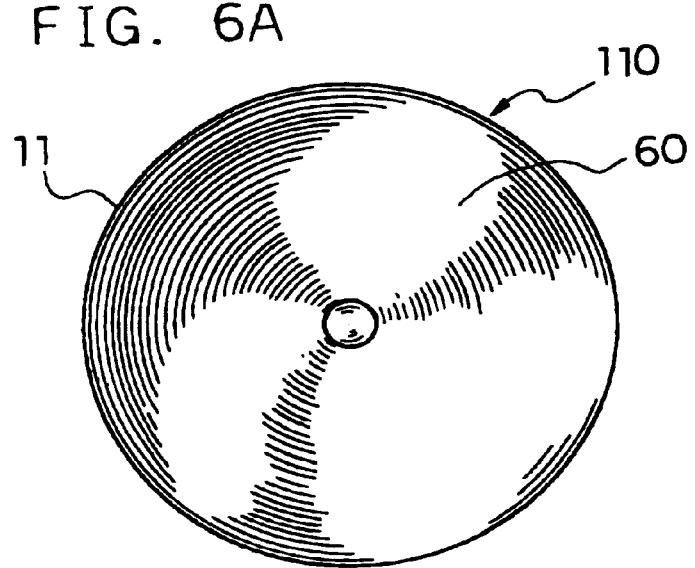
FIG. 6A is a plan view of an ultrasonic transmitter according to a third embodiment of the present invention.
Figure 6B:
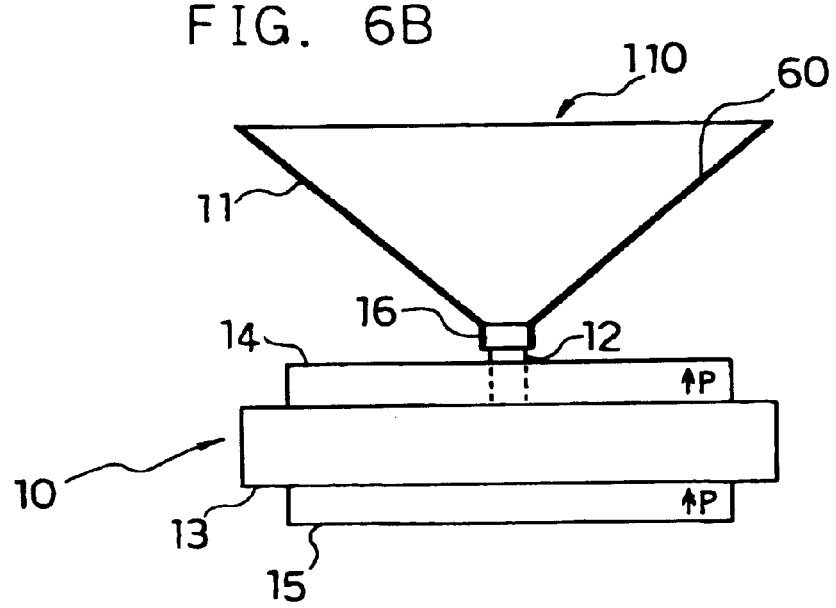
FIG. 6B is a vertical cross-sectional view showing a construction of an ultrasonic transmitter of FIG. 6A.

FIG. 6A is a plan view of the ultrasonic transmitter according to the third embodiment of the present invention, and FIG. 6B is a vertical cross-sectional view showing the construction of the ultrasonic transmitter of FIG. 6A. In the third embodiment, those parts which are substantially the same in function and construction as the corresponding parts in the first embodiment are designated by the same reference numerals as those used in the first embodiment.

In FIGS. 6A and 6B, the piezoelectric vibrator 10 comprises a disc-shaped vibrating plate 13 made of a metal such as stainless steel and piezoelectric discs 14, 15 bonded to opposite faces of the vibrating plate 13.

The piezoelectric discs 14, 15 are arranged in such a manner that their polarizations become equal in the direction and magnitude as shown by arrow P in FIG. 6B. A rod 12 for connecting a cone 11 thereto is provided on the surface of the vibrating plate 13 where the piezoelectric disc 14 is fixedly attached.

The cone 11, as a diaphragm held on the piezoelectric disc 14 via the rod 12, is a hollow conical structure made of a light metal such as aluminum. On the inside surface of the cone 11 is formed a monomolecular film 60, thus forming a cone vibrator 110.

As shown in FIG. 6B, the protrusion 16 located at the conical vertex of the cone vibrator 110 is connected to one end of the rod 12, the other end of which is connected to the center of the vibrating plate 13.

In the above-mentioned ultrasonic transmitter, the natural frequency of deflective vibration of the bimorph vibration device is in the ultrasonic frequency range. Electrodes are formed over the entire regions of the principal faces of the piezoelectric discs 14, 15 (the upper and lower faces of the piezoelectric discs 14, 15 in FIG. 6B). When an AC voltage is applied to the thus constructed bimorph vibration device, causing the bimorph vibration device to make the deflective vibration, the composite vibrating unit consisting of the piezoelectric vibrator 10 and the cone vibrator 110 makes vibration and an ultrasonic wave is output.

As shown in FIGS. 6A and 6B, the monomolecular film 60 is formed on the inside conical surface of the cone vibrator 110. This monomolecular film 60 is formed by the LB (Lnagmuir-Blodgett) method. That is, molecules containing both hydrophilic and hydrophobic groups, for example, a surface activated substance such as stearic acid, are transferred to the hydrophilized inside conical surface of the cone 11 for film formation.

With this film formation method, hydrophobic groups are formed on the surface of the monomolecular film 60. As a result, the cone vibrator 110 in the third embodiment has water repellent and drip-proof capabilities.

In order to increase ultrasonic sound-pressure output, the vibrational displacement of the cone vibrator 110 must be made large. The monomolecular film 60 of the cone vibrator 110 in the third embodiment is thin and light in weight. Accordingly, a large sound-pressure output can be maintained without adversely influencing the vibrational displacement of the cone vibrator 110 and while providing the water repellent and drip-proof capabilities.

In the third embodiment, the monomolecular film 60 is formed on the inside surface of the cone 11 by the LB method. Therefore, according to the third embodiment, the bonding strength of the monomolecular film 60 to the cone 11 is large, and the monomolecular film 60 does not easily separate from the cone 11 by the vibration of the cone vibrator 110, thus ensuring a stable sound-pressure output.

Also, in an ultrasonic receiver which has the same structure as the ultrasonic transmitter of the third embodiment, formation of the monomolecular film on the inside surface of the cone does not adversely influence the vibration of the cone. Accordingly, the ultrasonic receiver having the same structure as the ultrasonic transmitter of the third embodiment can prevent sensitivity decrease of ultrasonic wave, while retaining the drip-proof capability.

As described above, according to the third embodiment, by forming a lightweight monomolecular film 60 on the inside conical surface of the cone vibrator 110, an ultrasonic transmitter and an ultrasonic receiver can be achieved without adversely influencing the transmitter's sound-pressure output and without reducing the receiver s receiving sensitivity, while providing the cone vibrator 110 with water repellent and drip-proof capabilities.

Embodiment 4

An ultrasonic transmitter according to a fourth embodiment of the present invention will be described below with reference to FIGS. 7 to 11.

Figure 7:
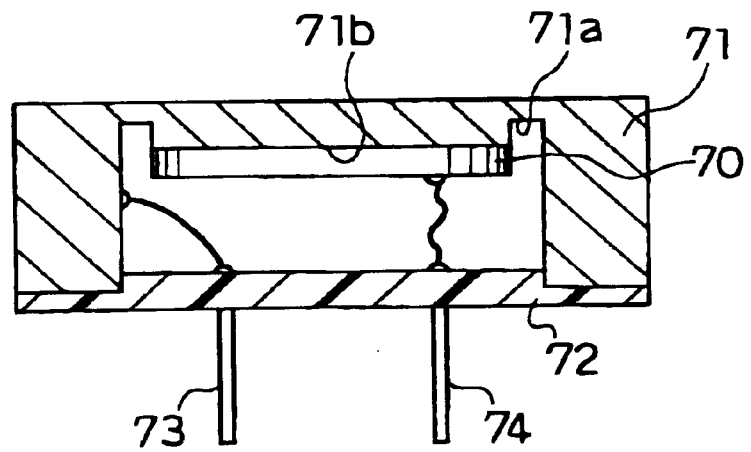
FIG. 7 is a side elevational view, in cross section, showing a construction of an ultrasonic transmitter of a fourth embodiment.

FIG. 7 is a side elevational view, in cross section, showing the construction of the ultrasonic transmitter of the fourth embodiment. As shown in FIG. 7, the ultrasonic transmitter comprises a vibrating cylinder 71 which is a cylindrically shaped metal having a closed top and an open bottom. The vibrating cylinder 71 is made by a known metal forming process such as die casting. A piezoelectric disc 70, a disc-shaped piezoelectric element, is fixedly attached to an upper inside face 71b of the vibrating cylinder 70. Electrodes are formed on the upper and lower faces, i.e., the principal faces, of the piezoelectric disc 70. The electrode on the upper face of the piezoelectric disc 70 is bonded to the vibrating cylinder 71 in electrically conducting relationship. The open bottom of the vibrating cylinder 71 is closed by a base 72 which is a plastic lid. The base 72 is provided with two terminal pins 73 and 74. The terminal pin 73 is electrically connected to the vibrating cylinder 71, while the other pin 74 is electrically connected to the electrode on the lower face of the piezoelectric disc 70. The vibrating cylinder 71 is made of a high rigidity metal material such as stainless steel and, as shown in FIG. 7, the piezoelectric disc 70 is bonded to its upper inside face 71b. A groove 71a the circumferential portion of the upper inside face around the piezoelectric disc 70. Thus the vibrating cylinder 71 is a cylindrical metal vibrator having a hollow interior space and an open end; when an AC voltage of an ultrasonic frequency is applied to the terminal pins 73, 74, this metal vibrator vibrates at the ultrasonic frequency and outputs an ultrasonic wave.

The magnitude of sound-pressure output of the ultrasonic transmitter is determined by the displacement volume when the metal vibrating portion vibrates. Accordingly, in order to increase the sound-pressure output of the ultrasonic transmitter in the fourth embodiment, the amount of deflective displacement of the bottom disc of the vibrating cylinder 71 must be made as large as possible.

Figure 8:
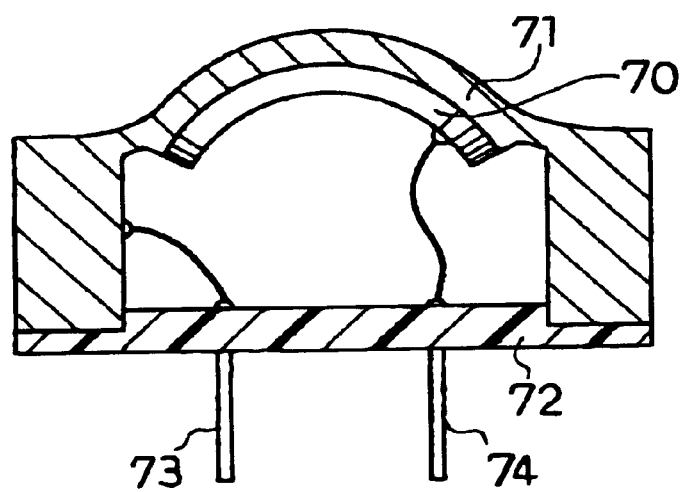
FIG. 8 is a side elevational view, in cross section, conceptually illustrating a vibrational displacement condition of the ultrasonic transmitter shown in FIG. 7.

FIG. 8 is a side elevational view, in cross section, conceptually illustrating a vibrational displacement condition of the ultrasonic transmitter shown in FIG. 7. The vibrating cylinder 71 shown in FIG. 7 has a groove 71a with a rectangular cross section, formed in the circumference of the upper inside face. This serves to increase the amount of deflective displacement in the upper inside face of the vibrating cylinder 71, increasing the sound-pressure output. Furthermore, the piezoelectric disc 70 and the wiring portions of the terminal pins 73, 74 are housed in the space enclosed by the vibrating cylinder 71 and the base 72. Thus the ultrasonic transmitter of the fourth embodiment has drip-proof and dust-proof capabilities.

Figure 9:
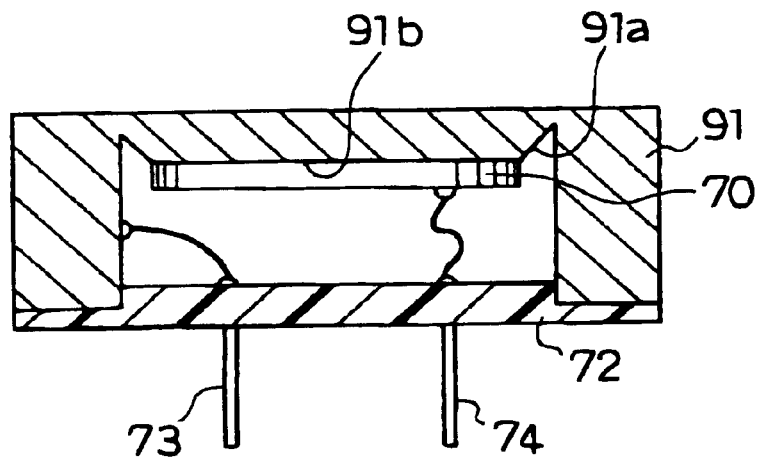
FIG. 9 is side elevational views, in cross section, showing a construction of modified embodiments of an ultrasonic transmitter of the present invention.
Figure 10:
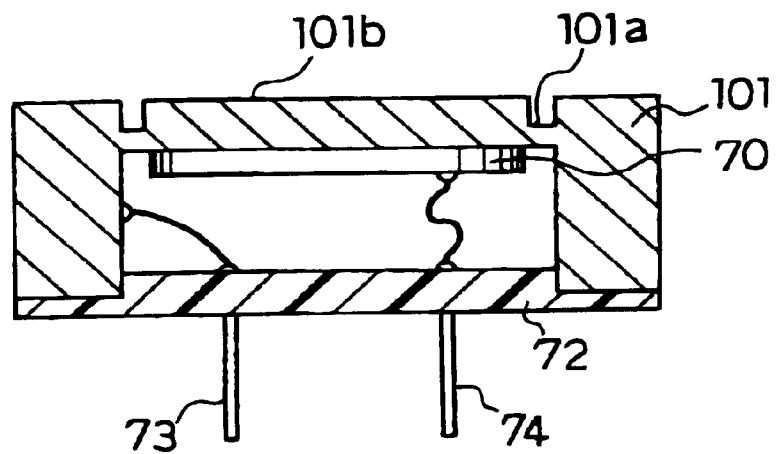
FIG. 10 is side elevational views, in cross section, showing a construction of modified embodiments of an ultrasonic transmitter of the present invention.
Figure 11:
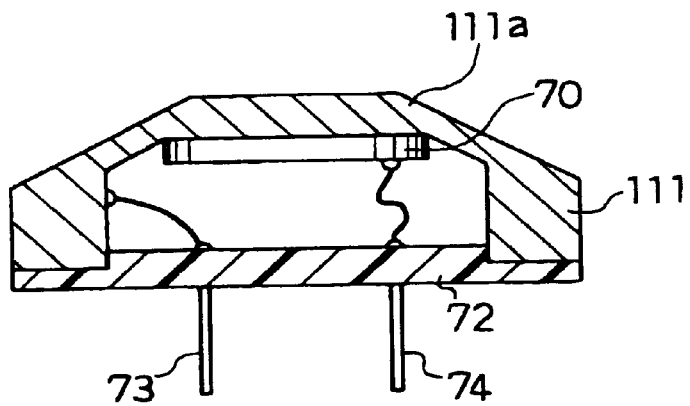
FIG. 11 is side elevational views, in cross section, showing a construction of modified embodiments of an ultrasonic transmitter of the present invention.

Modified embodiments of the ultrasonic transmitter of the present invention are shown in FIGS. 9, 10, and 11. The ultrasonic transmitters shown in FIGS. 9, 10, and 11 are so constructed as to increase the amount of deflective displacement of the vibrating cylinder as much as possible in order to increase the sound-pressure output.

The ultrasonic transmitter shown in FIG. 9 differs from the ultrasonic transmitter shown in FIG. 7 in the shape of the annular groove 91a formed around the circumference of the piezoelectric disc 70 on the upper inside face 91b of the vibrating cylinder 91; that is, the groove is wedge-shaped in cross section with an acute angle. In other respects, the construction is similar to the ultrasonic transmitter shown in FIG. 7, and those parts in FIG. 9 with the same in function and construction as those previously shown are designated by the same reference numerals.

In the ultrasonic transmitter shown in FIG. 10, no groove is formed around the circumference of the piezoelectric disc 70 on the upper inside face of the vibrating cylinder 101, but instead, an annular groove 101a an upper outside face 101b of the vibrating cylinder 101 in the position opposite from the position around the circumference of the piezoelectric disc 70. In other respects, the construction is the same as the ultrasonic transmitter shown in FIG. 7, and those parts in FIG. 10 with the same in function and construction as those previously shown are designated by the same reference numerals.

The ultrasonic transmitter shown in FIG. 11 has a sloping portion 111a formed on the upper outside face of the vibrating cylinder 111. As shown in FIG. 11, the shape of the vibrating cylinder 111 is such that the thickness of the sloping portion 111a is reduced compared with the thickness of the portion where the piezoelectric disc 70 is bonded. In other respects, the construction is the same as the ultrasonic transmitter shown in FIG. 7, and those parts in FIG. 11 with the same in function and construction as those previously shown are designated by the same reference numerals.

Figure 12:
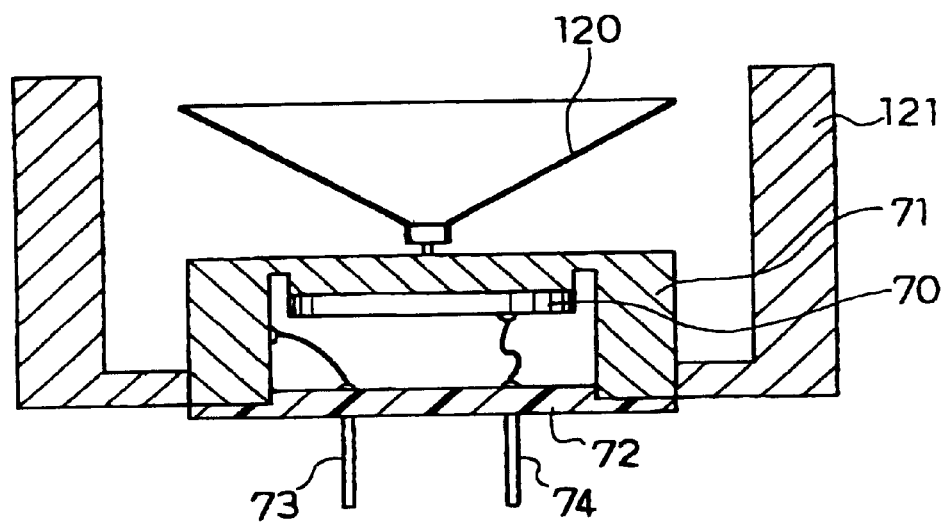
FIG. 12 is a side elevational view, in cross section, showing a specific example of the use of the ultrasonic transmitter.

Next, a specific example of the use of the ultrasonic transmitter of the fourth embodiment is shown in FIG. 12. FIG. 12 is a side elevational view, in cross section, showing a specific example of the use of the ultrasonic transmitter.

In FIG. 12, those parts with the same in function and construction as those in the ultrasonic transmitter of FIG. 7 are designated by the same reference numerals as those used in FIG. 7.

In this example, a cone 120, as a hollow conical-shaped diaphragm, is mounted on the vibrating cylinder 71 of the ultrasonic transmitter of the fourth embodiment, as shown in FIG. 12. This serves to further increase the sound-pressure output of the ultrasonic transmitter compared with the foregoing embodiments. In the fourth embodiment, the node of vibration the cone 120 at positions symmetrical about the center axis of the cone 11. Further, an ultrasonic wave reflector 121 having an open end is mounted to the vibrating cylinder 71 to match the phase of the ultrasonic wave to that of the cone 120 and reflect the ultrasonic wave radiated from the rear surface of the cone 120. In this way, the ultrasonic transmitter achieves a large output and sharp directivity while, at the same time, providing protection against water drops and dust.

As described above, according to the fourth embodiment, the thickness of the portion 111a of the vibrating cylinder 71, surrounding the portion where the piezoelectric disc 70 is bonded, is reduced compared with the center portion thereof, to increase the amplitude of the vibrating face of the vibrating cylinder. This achieves the construction of an ultrasonic transmitter which is compact in size and capable of producing a large output, and which has drip-proof and dust-proof capabilities.

Embodiment 5

A fifth embodiment of the ultrasonic transmitter of the present invention will be described below with reference to FIGS. 13 and 14.

Figure 13:
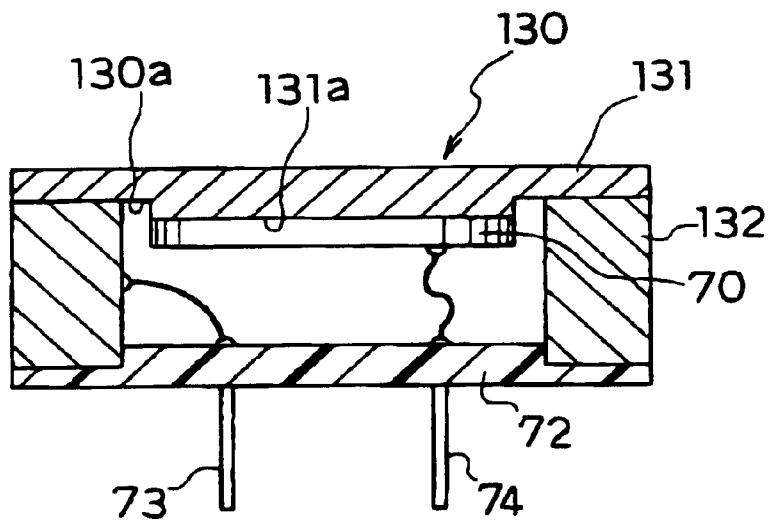
FIG. 13 is a side elevational view, in cross section, showing a construction of an ultrasonic transmitter of a fifth embodiment.

FIG. 13 is a side elevational view, in cross section, showing the construction of the ultrasonic transmitter of the fifth embodiment. In FIG. 13, constituent elements which are the same in function and construction as those in the ultrasonic transmitter of the foregoing fourth embodiment are designated by the same reference numerals, and explanatory descriptions of such elements are omitted.

As shown in FIG. 13, a vibrating cylinder 130 comprises a disc-shaped vibrating plate 131 and a cylindrically shaped member 132 having an open upper end and an open lower end, the vibrating plate 131 being mounted in such a manner as to close the open upper end of the cylindrical member 132. The piezoelectric disc 70 is fixedly attached to the lower face 131a of the vibrating plate 131, and the electrode on the upper face of the piezoelectric disc 70 is bonded to the vibrating plate 131 in electrically conducting relationship.

The vibrational displacement condition of the ultrasonic transmitter of the fifth embodiment is indicated by the amount of deflective displacement of the vibrating plate 131, similarly to that shown in FIG. 8 in the foregoing fourth embodiment. In the ultrasonic transmitter of the fifth embodiment, a groove 130a the vibrating cylinder 130. Accordingly, the vibrational displacement is large on the inside of the groove 130a, while on the other hand, the amount of vibrational displacement is extremely small on the outside of the groove 130a. This structure significantly reduces the internal stress occurring in the joint between the vibrating plate 131 and the cylindrical member 132, as a result of which the structure and shape of the vibrating cylinder 130 in the ultrasonic transmitter of the fifth embodiment does not adversely influence the amount of deflective displacement of the vibrating plate 131 and can thus achieve an increase in the sound-pressure output of the ultrasonic transmitter.

The ultrasonic transmitter of the fifth embodiment can be manufactured by bonding the piezoelectric disc 70 and the vibrating plate 131 together and then bonding the vibrating plate 131 to the cylindrical member 132. In this way, in the ultrasonic transmitter of the fifth embodiment, the vibrating cylinder 130 comprises the vibrating plate 131 and the cylindrical member 132. Therefore, according to the fifth embodiment, the vibrating cylinder 130 need not be formed as a one-piece unit by metal cutting, and thus an inexpensive, easy-to-manufacture ultrasonic transmitter can be achieved.

Next, a specific example of an alternative construction of the ultrasonic transmitter of the fifth embodiment will be described.

Figure 14:
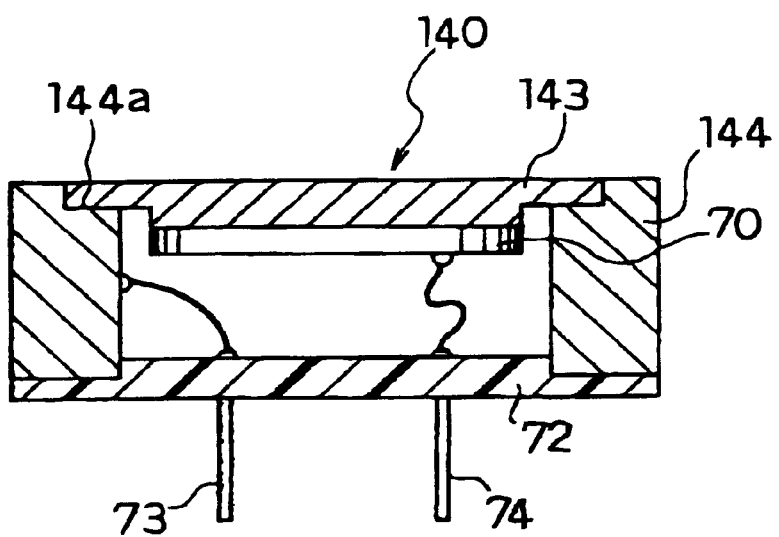
FIG. 14 is a side elevational view, in cross section, showing an alternative construction of a ultrasonic transmitter.

FIG. 14 is a side elevational view, in cross section, showing an alternative construction of the ultrasonic transmitter. As shown in FIG. 14, the ultrasonic transmitter of this example comprises a disc-shaped vibrating plate 143 and a cylindrically shaped cylindrical member 144 having an upper open end and a lower open end. A step 144a an end face of the upper open end of the cylindrical member 144. The vibrating plate 143 is fitted onto this step 144a to close the upper open end of the cylindrical member 144 as shown in FIG. 14. In other respect, the construction of the ultrasonic transmitter shown in FIG. 14 is the same as that of the ultrasonic transmitter shown in FIG. 13. Since the bonding portion to the vibrating cylinder 140 is formed outside the vibrating portion of the vibrating plate 141, stress due to the deflective displacement of the vibrating plate 141 does not adversely influence the bonding portion. As a result, the ultrasonic transmitter shown in FIG. 14 is free from breakage at the bonding portion and is therefore highly reliable in construction.

Embodiment 6

A sixth embodiment of the ultrasonic transmitter of the present invention will be described below with reference to accompanying drawings.

Figure 15:
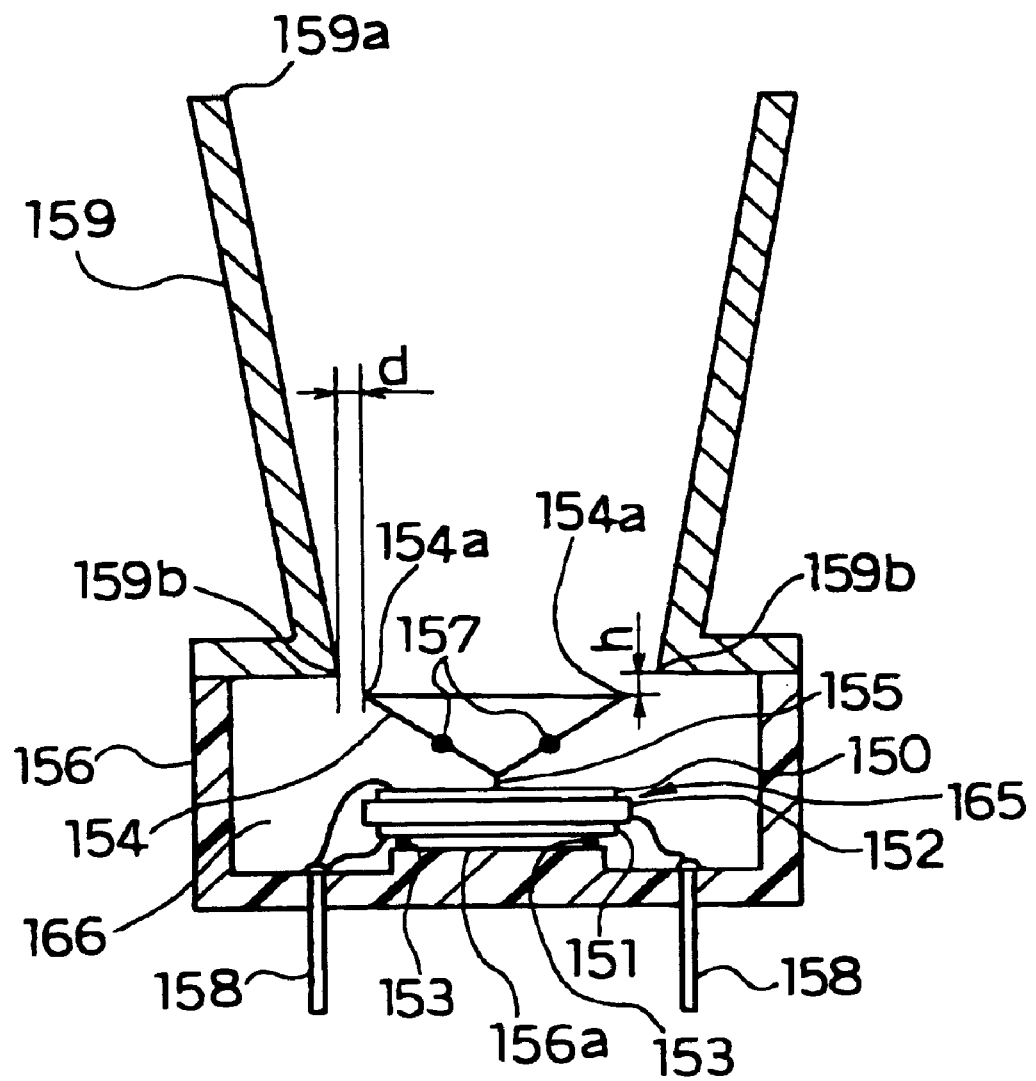
FIG. 15 is a side elevational view, in cross section, showing a construction of an ultrasonic transmitter of a sixth embodiment.

FIG. 15 is a side elevational view, in cross section, showing the construction of the ultrasonic transmitter of the sixth embodiment. In FIG. 15, the piezoelectric vibrator comprises a vibrating plate 152 made of a metal such as stainless steel and piezoelectric discs 150 and 151 bonded to opposite faces of the vibrating plate 152. An elastic member 153, a soft adhesive, is fixedly attached to the piezoelectric disc 151, and the piezoelectric vibrator is elastically supported on a base 156a of a housing 156 by means of the elastic member 153. A cone 154 of a conical structure is mounted on the other piezoelectric disc 150, and a terminal pin 155 for connecting the cone 154 is provided on the vibrating plate 152.

As shown in FIG. 15, terminal pins 158 for applying a voltage to the piezoelectric discs 150, 151 and vibrating plate 152 are provided passing through the housing 156. When a voltage is applied to the terminal pins 158, the piezoelectric vibrator vibrates with deflection, and a node 157 of vibration the cone 154. A conical-shaped horn 159 having a flared end is mounted on the housing 156 in which the composite vibrating unit consisting of the piezoelectric vibrator and the cone 154 is accommodated.

In FIG. 15, mark d indicates the spacing, in the direction perpendicular to the center axis of the conical-shaped horn 159, between an open end edge 154a of the cone 154 and a throat 159b of the horn 159. Further, mark h shows the spacing, in the direction parallel to the center axis of the conical-shaped horn 159, between the open end edge 154a of the cone 154 and the throat 159b of the horn 159.

The piezoelectric discs 150, 151 attached to the opposite faces of the vibrating plate 152 are annular discs each having a hole opened through the center thereof, and electrodes are formed on all principal faces (the upper and lower faces in FIG. 15) of the piezoelectric discs 150, 151. The piezoelectric discs 150 and 151 sandwiching the vibrating plate 152 between them are arranged in such a manner that their polarizations become equal in direction and magnitude. A bimorph vibration device consists of the piezoelectric discs 150 and 151 and the vibrating plate 152.

The cone 154 is a conical-shaped hollow vibrator made of a light metal such as aluminum. One end of the rod 155 is connected to the center of the vibrating plate 152, and the other end is connected to the conical vertex of the cone 154. Therefore, the piezoelectric vibrator as the bimorph vibration device and the cone 154 are mechanically connected together at their respective centers.

In the composite vibrating unit having the bimorph vibration device and the cone 154 in the sixth embodiment, when an AC voltage is applied to the bimorph vibration device to excite it into vibration with deflection, a ring-shaped node of vibration 157 produced in symmetry about the center axis of the cone 154 the conical surface thereof.

The composite vibrating unit consisting of the bimorph vibration device and the cone 154 is elastically supported on the base 156a of the housing 156 via the elastic member 153 at the node of deflective vibration of the bimorph vibration device.

In the sixth embodiment, the spacing d, in the direction perpendicular to the conical center axis, between the throat 159b of the conical-shaped horn 159 and the open end edge 154a of the cone 154, is set at one quarter of the wavelength of the output ultrasonic wave. Also, the spacing h, in the direction parallel to the conical center axis, between the throat 159b of the conical-shaped horn 159 and the open end edge 154a of the cone 154, is set at one quarter of the wavelength of the output ultrasonic wave. The composite vibrating unit is mounted on the base 156a by maintaining such positional relationships.

The composite vibrating unit outputs an ultrasonic wave at a designated frequency determined by the resonant frequency of the vibration mode of the bimorph vibration device and the natural frequency of the cone 154. The ultrasonic wave output from the composite vibrating unit propagates through the interior space of the horn 159 and is radiated into free space through the mouth 159a of the horn 159.

A specific example of the ultrasonic transmitter shown in FIG. 15 is given below.

This ultrasonic transmitter has an ultrasonic output frequency of 40 kHz, spacing d of 2 mm, spacing h of 2 mm, and the throat 159b of 24 mm in diameter. The horn length in the direction parallel to the center axis of the horn 159 is 50 mm, and the diameter of the mouth 159a of the horn 159 is 40 mm. As for the dimensions of the interior space of the housing 156, the height is 20 mm and the diameter of the circular bottom is 40 mm. Further, the step height of the base 156a in the interior space of the housing 156 is 2 mm.

Next, the operation of the ultrasonic transmitter of the sixth embodiment will be described.

Figure 16:
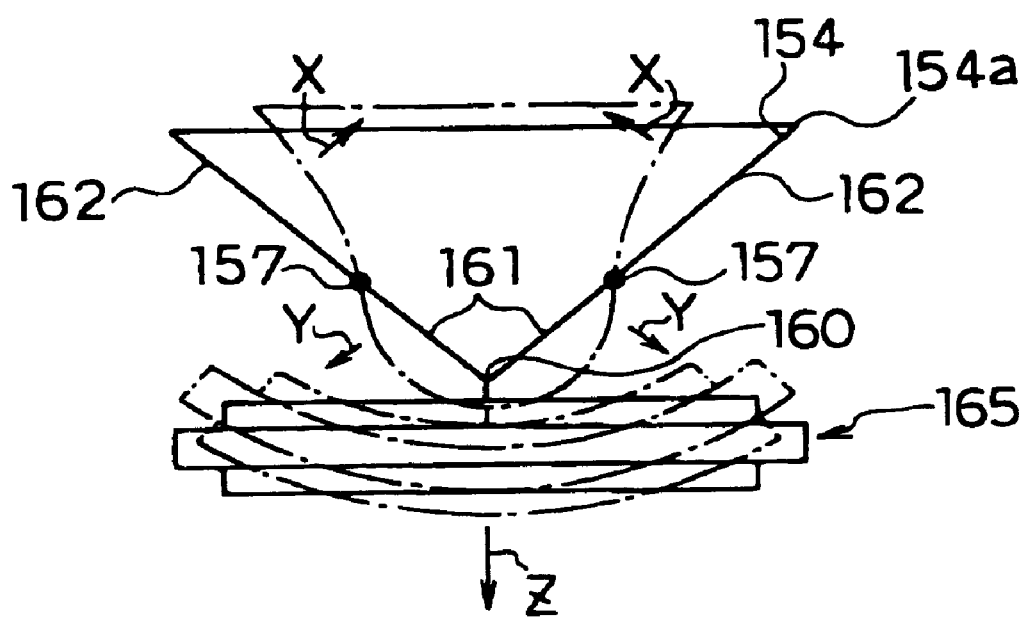
FIG. 16 is a diagram showing the vibrational displacement of a composite vibrating unit having a bimorph vibration device and a cone.

FIG. 16 is a diagram showing the vibrational displacement of the above-described composite vibrating unit consisting of the bimorph vibration device 165 and the cone 154. In FIG. 16, solid lines show the condition before the vibrational displacement, and alternate long and short dash lines show the condition when the vibrational displacement occurs. Arrows X, Y, and Z in FIG. 16 indicate the displacement directions of the bimorph vibration device 165 and the cone 154.

In FIG. 16, a reference numeral 160 indicates the conical vertex of the cone 154, a reference numeral 161 shows a face including the conical vertex 160 and bounded above by the vibration node 157, and a reference numeral 162 is a face including the open end edge 154a and bounded below by the vibration node 157.

The cone 154 and the bimorph vibration device 165 vibrate with the respective displacements, as shown in FIG. 16. When the bimorph vibration device 165 vibrates with deflection, the node 157 of vibration the cone 154. Therefore, when the composite vibrating unit vibrates, vibrations inverted in phase across the vibration node 157 are set up on the cone 154.

When the composite vibrating unit having the cone 154 and the bimorph vibration device 165 makes vibration as described above, ultrasonic waves are output from the bimorph vibration device 165 as well as from the inside and outside conical surfaces of the cone 154.

The ultrasonic waves thus output from the bimorph vibration device 165 and the cone 154. The ultrasonic waves interfere with each other in the interior space 166 of the housing 156 where the bimorph vibration device 165 is accommodated, or undergo multiple reflections at the bottom and side walls of the housing 156. Such ultrasonic waves enters the horn 159 through the space between the open end edge 154a of the cone 154 and the throat 159b of the horn 159.

The sound-pressure and phase of the ultrasonic wave entering through the gap between the open end edge 154a of the cone 154 and the throat 159b of the horn 159 can be adjusted by configuring the interior space 166 of the housing 156 in a desired shape. The configuration parameters include, for example, the distance from the composite vibrating unit to the bottom or side wall of the housing 156, the spacings d an h between the open end edge 154a of the cone 154 and the throat 159b of the horn 159, etc. Accordingly, the ultrasonic wave emitted from the inside surface of the cone 154 and the ultrasonic wave entering through the space between the open end edge 154a of the cone 154 and the throat 159b of the horn 159 are radiated into the interior space of the horn 159 as ultrasonic waves differing in phase with respect to each other.

According to an experiments conducted by the inventors of the present invention, for a better effect of ultrasonic wave generation it was found preferable to set the spacing d between the throat 159b of the horn 159 and the open end edge 154a of the cone 154, in the radial direction of the cone to be longer at not less than one quarter of the wavelength of the output ultrasonic wave. It was also found preferable to set the spacing h between the throat 159b of the horn 159 and the open end edge 154a of the cone 154 in the direction parallel to the center axis of the cone to be around one quarter of the wavelength of the output ultrasonic wave.

Figure 17A:
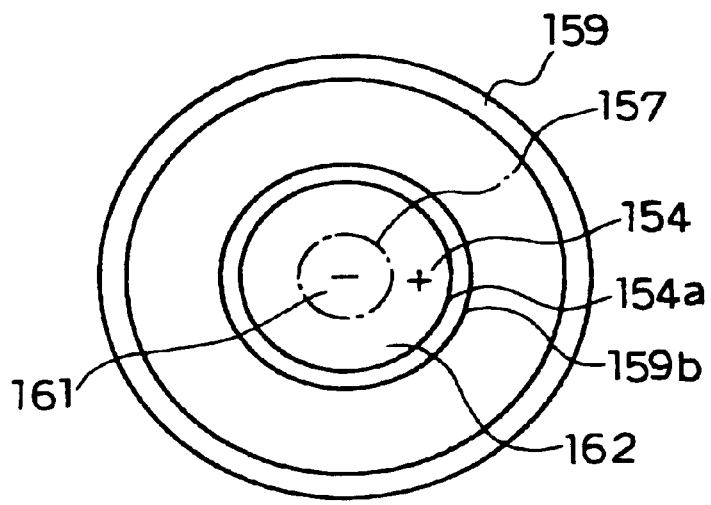
FIG. 17A is a plan view showing sound sources in an ultrasonic transmitter of a sixth embodiment.
Figure 17B:
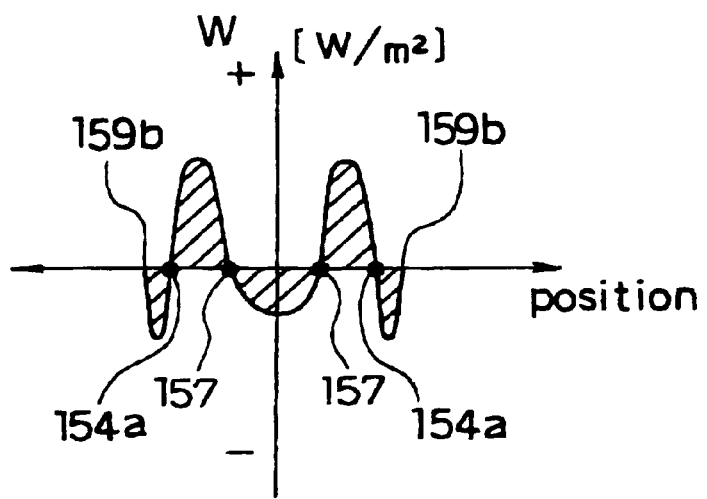
FIG. 17B is a graph showing a distribution of acoustic energy radiated from sound sources shown in FIG. 17A.

FIG. 17A is a plan view showing sound sources in the ultrasonic transmitter of the sixth embodiment, and FIG. 17B is a graph showing the distribution of acoustic energy radiated from the sound sources shown in FIG. 17A. In FIG. 17B, the position of the sound sources is plotted along the abscissa and the magnitude of the acoustic energy along the ordinate. In FIGS. 17A and 17B, inward displacements of the cone 154 by ultrasonic waves are taken as positive (+) and displacements in the opposite direction as negative (−).

As shown in FIG. 17B, the ultrasonic transmitter of the sixth embodiment is constructed so that the acoustic energy of the ultrasonic wave radiated from the inside surface 162, including the open end edge 154a, of the cone 154 produces a vibrational displacement opposite in sign from that produced by the acoustic energy of the ultrasonic wave radiated through the gap between the open end edge 154a and the throat 159b.

Since the node 157 of vibration 157 the cone 154, the face 161 inside the vibration node 157 and the face 162 outside it vibrate with different phases. Therefore, the acoustic energies from the respective faces are opposite in sign. Thus the conical surface of the cone 154 vibrates symmetrically about its center axis, thereby increasing the amplitude of vibration of the cone 154 for increased sound-pressure output. As described above, according to the sixth embodiment, since the cone 154 has a plurality of annular sound sources, directivity can be enhanced.

Figure 18:
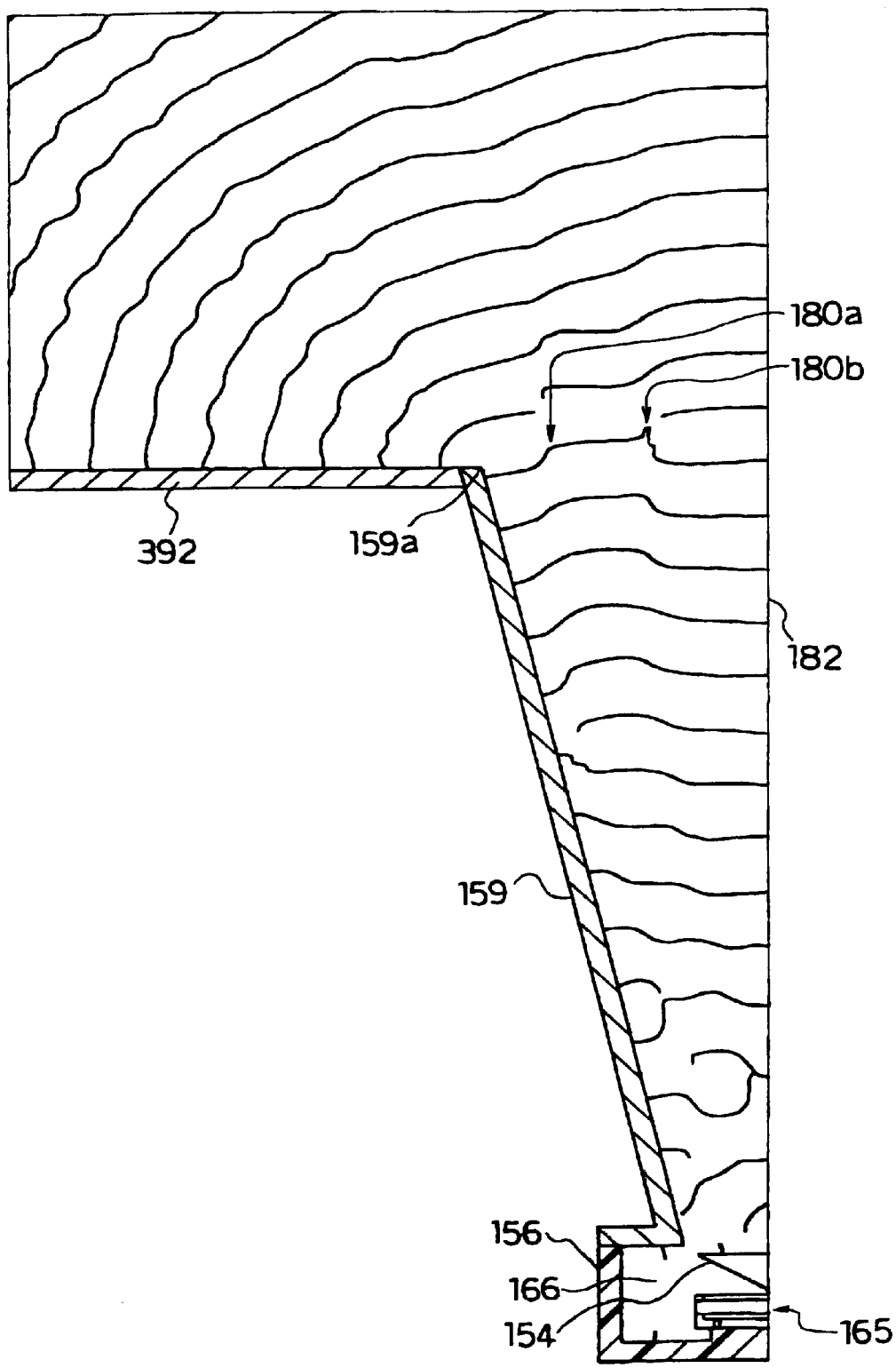
FIG. 18 is a phase distribution curve diagram simulating ultrasonic waves radiated from sound sources in the ultrasonic transmitter of the sixth embodiment.

Next, the propagation of the ultrasonic waves output from the thus constructed sound sources of the sixth embodiment will be described with reference to FIG. 18. FIG. 18 is a phase distribution curve diagram simulating the ultrasonic waves radiated from the sound sources in the ultrasonic transmitter of the sixth embodiment and propagating through the space inside and outside the ultrasonic horn 159.

Since the phase distribution curves of the ultrasonic waves are symmetrical about the center axis 182 of the conical-shaped horn 159, the ultrasonic wave phase distribution curve diagram of FIG. 18 shows one half of the conical-shaped horn 159 divided along its center axis 182.

In FIG. 18, the curved stripe patterns show in-phase propagation of the ultrasonic waves, and reference numeral 392 indicates an imaginary baffle assumed at the mouth 159a of the horn 159. In this simulation, vibrations other than the vibrations from the cone 154 and the bimorph vibration device 165 are excluded by the presence of the baffle 392.

As shown in FIG. 18, in-phase vibration planes parallel to a plane perpendicular to the conical center axis 182 of the horn 159 are not formed at the mouth 159a which is in the output plane of the horn 159, but large phase discontinuities occur at least at points (180a and 180b). These phase discontinuities 180a and 180b serve to enhance the directivity of the ultrasonic waves output from the ultrasonic transmitter of the sixth embodiment. This is because the ultrasonic waves of different phases on both sides of the phase discontinuity 180a located outward of the phase discontinuity 180b act to suppress the dispersion of the ultrasonic wave inside of the phase discontinuity 180b.

In this way, in the ultrasonic transmitter of the sixth embodiment, the ultrasonic wave near the center axis 182 of the horn 159 is prevented from dispersing because of the presence of the two ultrasonic waves formed on the outside of the phase discontinuity 180b, as a result, the acoustic energy of the ultrasonic waves output from the ultrasonic transmitter of the sixth embodiment, the ultrasonic waves are concentrated in a narrow space. This increases the directivity of the ultrasonic waves output from the ultrasonic transmitter of the sixth embodiment.

Figure 19:
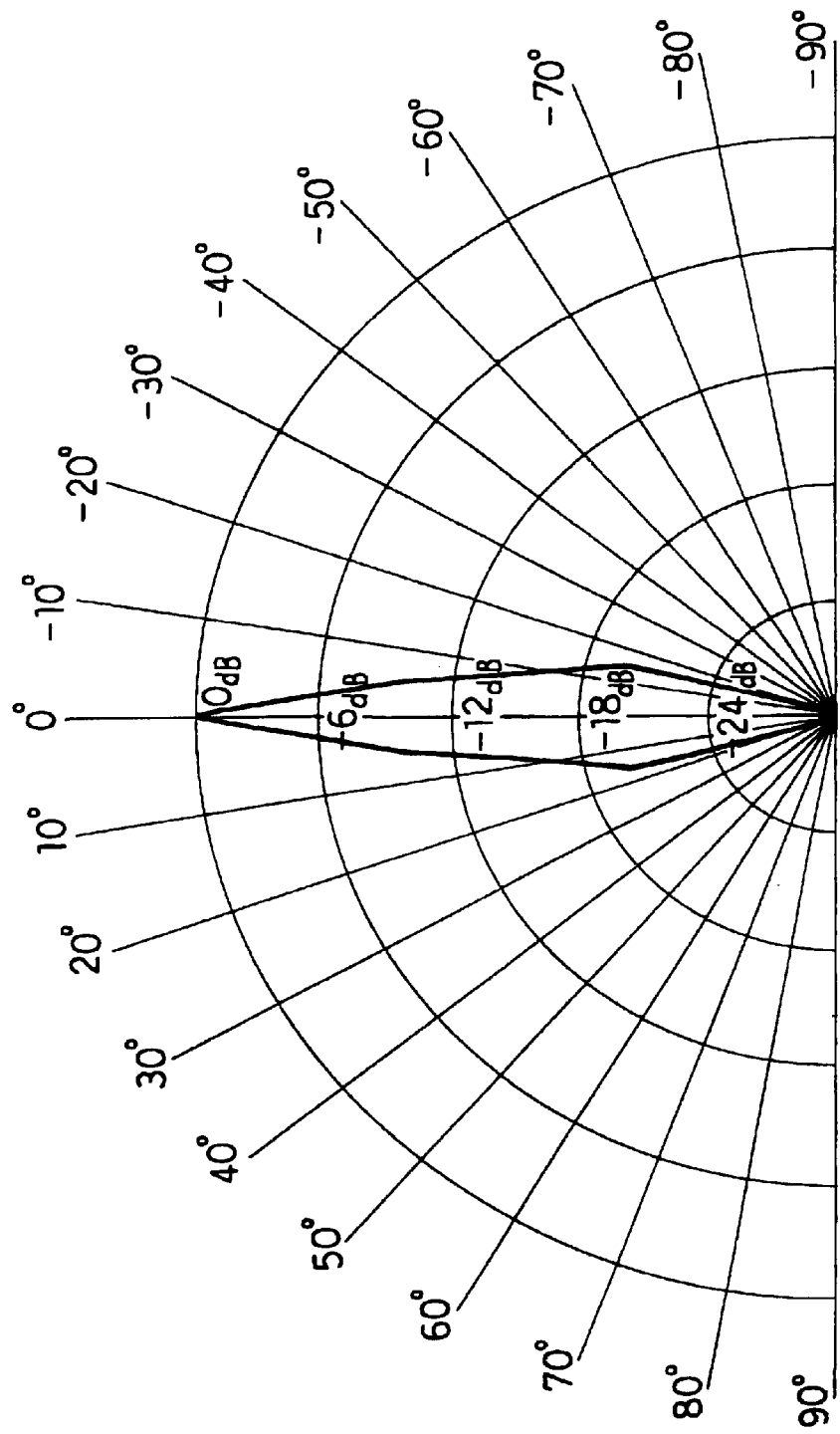
FIG. 19 is a diagram describing in a polar coordinate system showing relationship between an angle relative to the center axis of the horn and the sound-pressure output.

FIG. 19 is a diagram describing in a polar coordinate system showing the relationship between the angle relative to the center axis 182 of the horn 159 and the sound-pressure output at that angular position, when observed at a position a given distance away from the mouth 159a of the conical-shaped horn 159.

Note here that the polar coordinates in FIG. 40 previously described in connection with the prior art were for the ultrasonic transmitter having the bimorph vibration device, cone, and horn identical in size to the bimorph vibration device 165, cone 154, and horn 159 used in the ultrasonic transmitter of the sixth embodiment.

Figure 40:
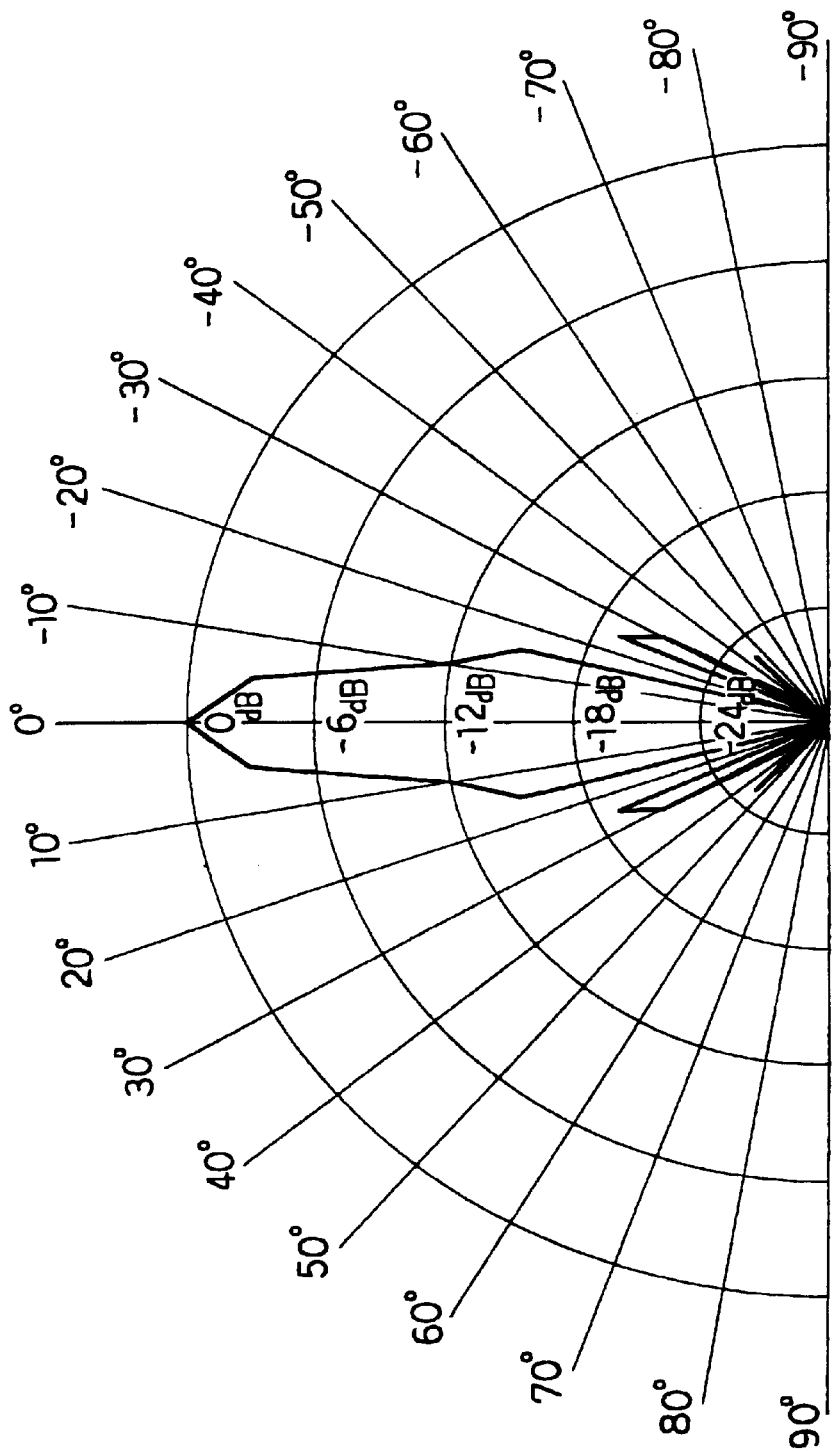
FIG. 40 is the diagram describing in a polar coordinate system the relationship between the angle relative to the center axis of the horn and the sound-pressure of the output ultrasonic wave.
Figure 41:
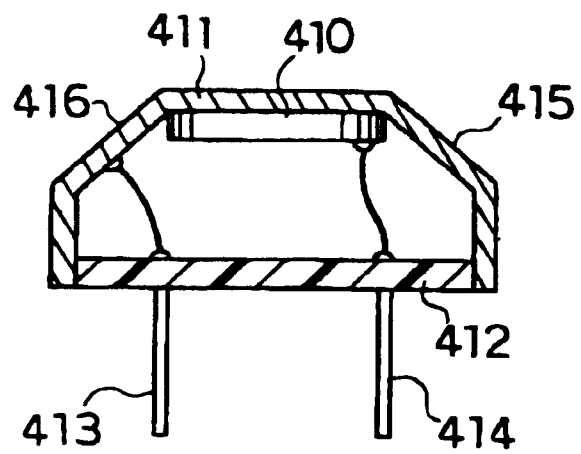
FIG. 41 is the side elevational view, in cross section, showing the construction of the conventional drip-proof type ultrasonic transmitter.
Figure 42:
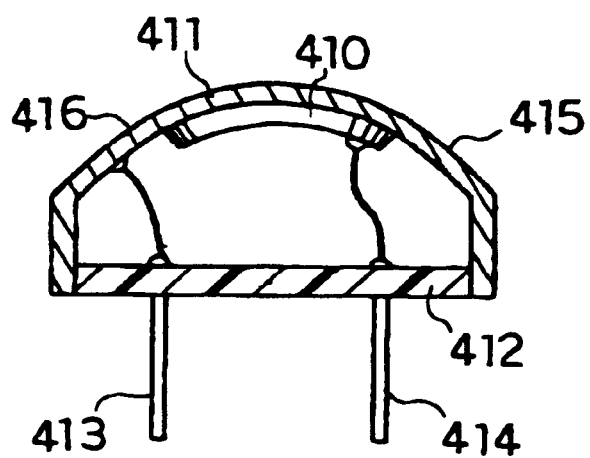
FIG. 42 is the side elevational view, in cross section, conceptually showing the conventional drip-proof type ultrasonic transmitter in the condition of the vibrational displacement.

As can be seen from the comparison between FIG. 19 and FIG. 40, the ultrasonic transmitter of the sixth embodiment (FIG. 19) achieves a sharper sound-pressure directivity than the conventional ultrasonic transmitter (FIG. 40), as shown by the sound-pressure half angle representing the sound-pressure angle at −6 dB, the presence or absence of a side lobe, etc.

Figure 38:
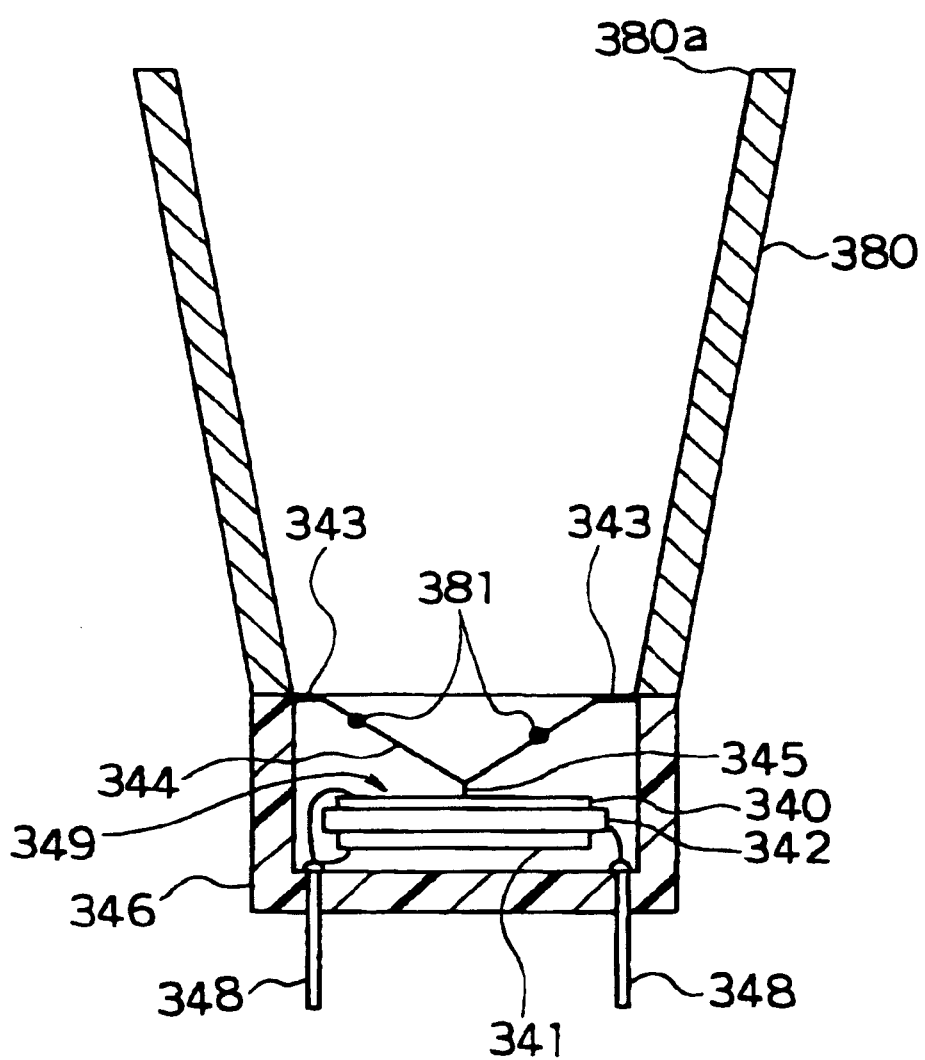
FIG. 38 is the side elevational view, in cross section, showing a construction of the conventional ultrasonic transmitter equipped with the horn.
Figure 34:
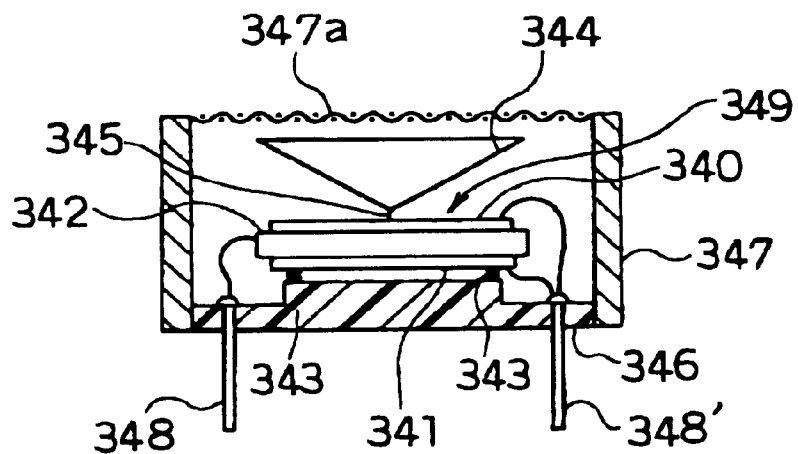
FIG. 34 is the side elevational view, in cross section, showing the construction of the conventional ultrasonic transmitter.
Figure 35:
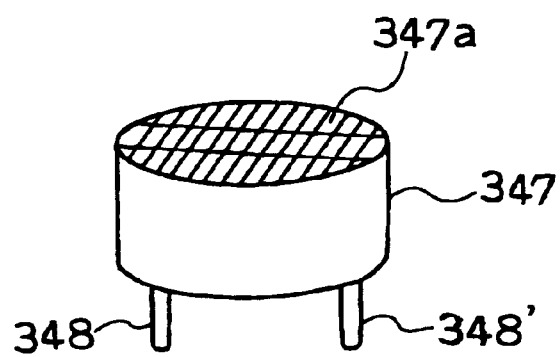
FIG. 35 is the perspective view showing the external appearance of the conventional ultrasonic transmitter provided with the housing.
Figure 36:
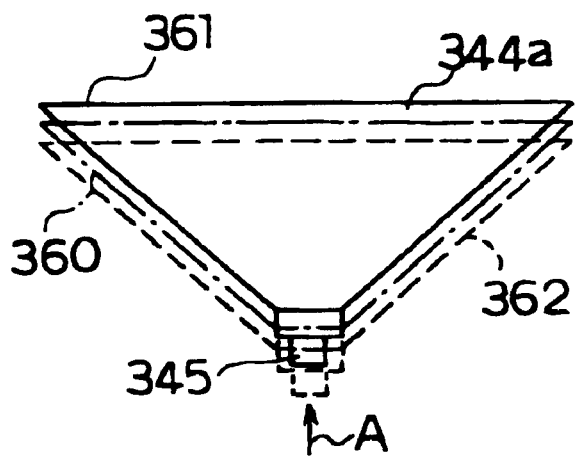
FIG. 36 is the side view showing vibrational displacement of the ideal cone which is mounted on the piezoelectric vibrator, the bimorph vibration device, in order to increase ultrasonic sound-pressure output.
Figure 37:
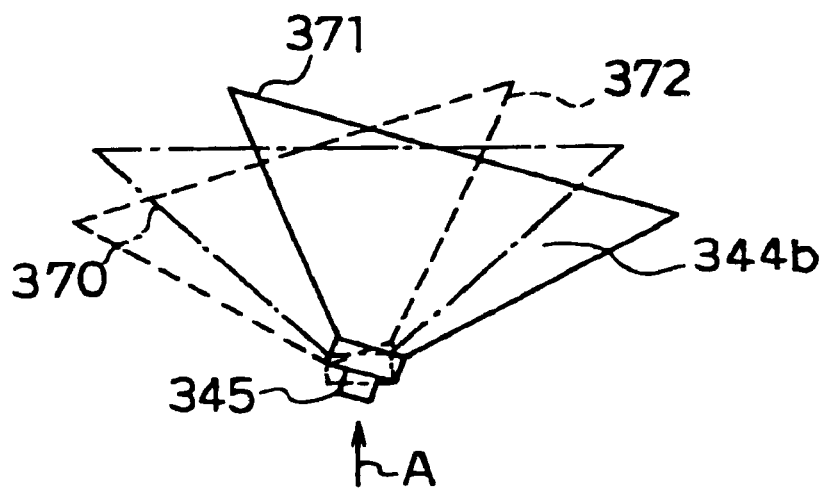
FIG. 37 is the side view showing one example of the vibrational displacement of the practical cone when outputting the ultrasonic sound-pressure.
Figure 39:
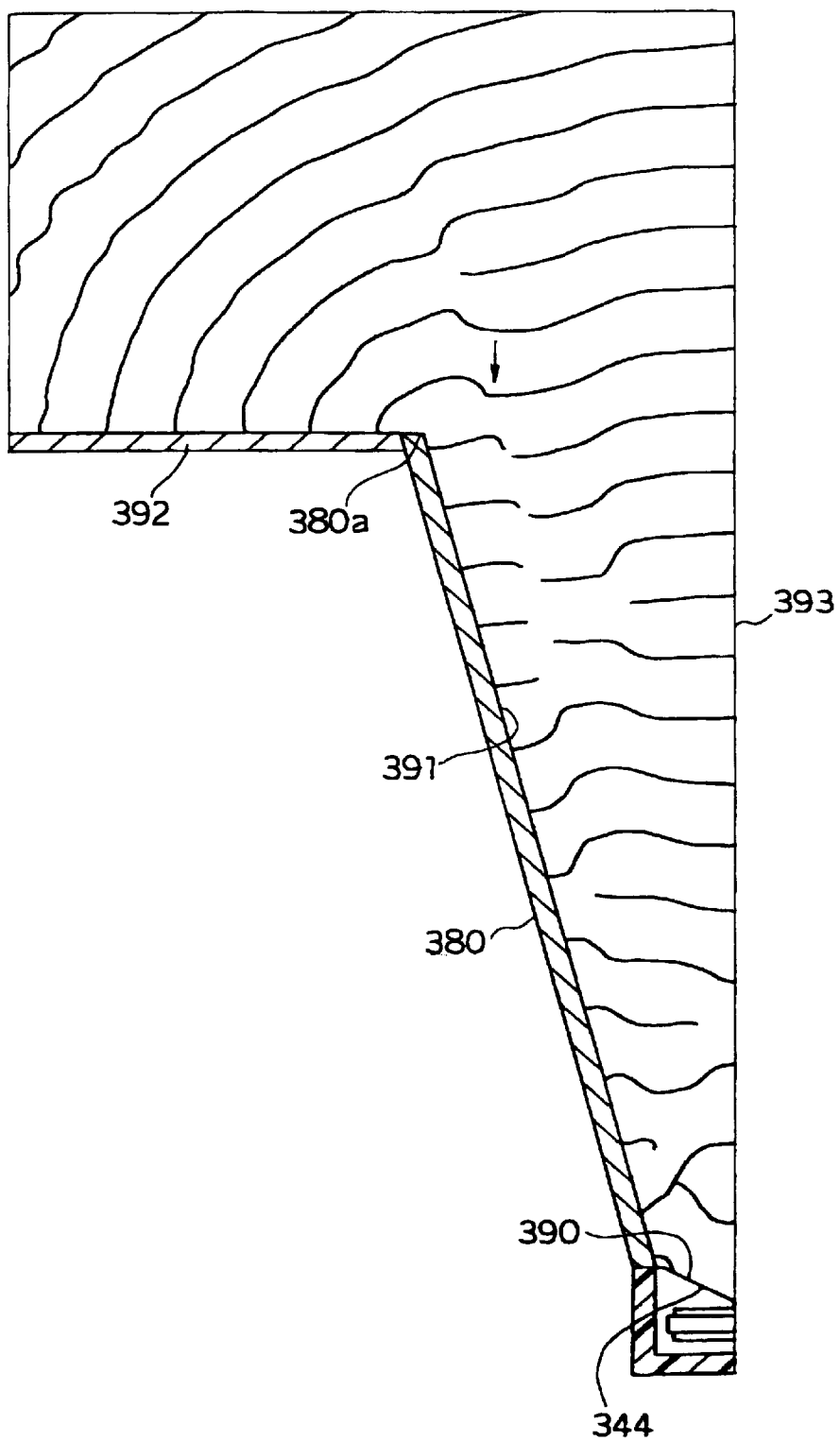
FIG. 39 is the phase distribution curve diagram simulating the ultrasonic wave propagating inside the conical-shaped horn 380 in the conventional ultrasonic transmitter.

The inventor of the present invention compared the ultrasonic transmitter of the sixth embodiment shown in FIG. 15 with the conventional ultrasonic transmitter shown in FIG. 38, and confirmed that the ultrasonic transmitter of the sixth embodiment had a sharper, superior directivity.

It was also confirmed that the ultrasonic transmitter of the sixth embodiment without the horn 159 showed excellent sharp directivity compared with the conventional ultrasonic transmitter without a horn.

Figure 20:
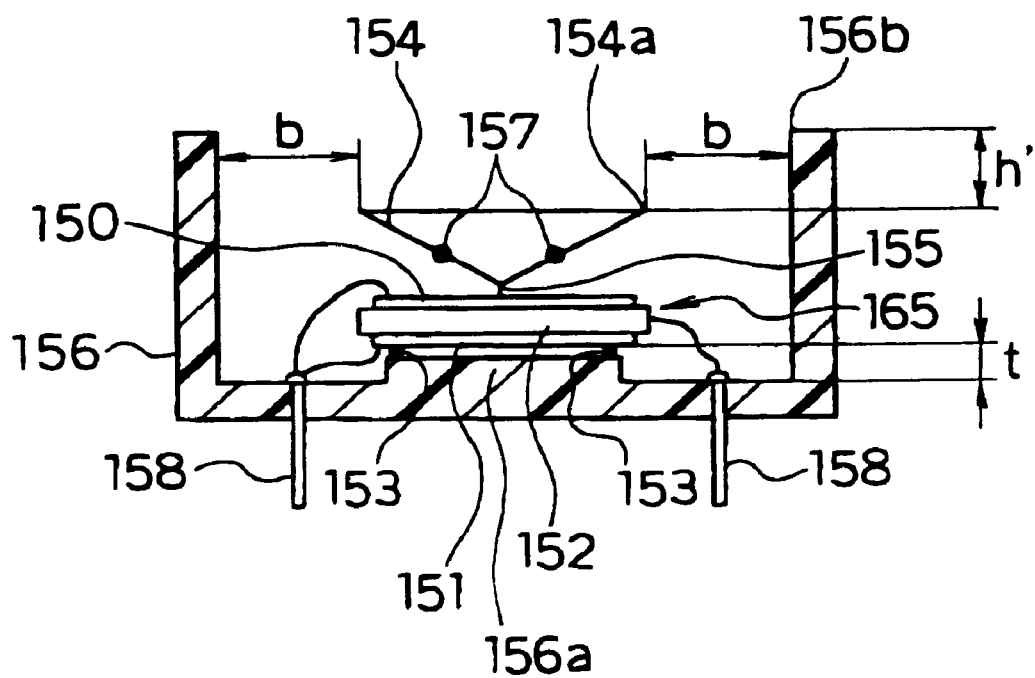
FIG. 20 is a side elevational view, in cross section, showing a construction of the ultrasonic transmitter in which a composite vibrating unit having the bimorph vibration device and the cone is accommodated inside a cylindrical housing having a closed bottom.

FIG. 20 is a side elevational view, in cross section, showing the construction of the ultrasonic transmitter in which the composite vibrating unit consisting of the bimorph vibration device 165 and the cone 154 is accommodated inside the cylindrical housing 156 having a closed bottom.

In FIG. 20, mark b shows the spacing, in the direction perpendicular to the center axis of the cone 154, between the open end edge 154a of the cone 154 and the open end edge 156b of the housing 156, and mark h' indicates the spacing, in the direction parallel to the center axis of the cone 154, between the open end edge 154a of the cone 154 and the open end edge 156b of the housing 156. Further, mark t is the distance from the bottom face of the housing 156 accommodating the composite vibrating unit to the bottom face of the composite vibrating unit.

A specific example of the ultrasonic transmitter shown in FIG. 20 is given below.

This ultrasonic transmitter produces an ultrasonic wave at a frequency of 40 kHz, and the spacing b is 10 mm. As for the dimensions of the interior space of the housing 156, the height is 20 mm and the diameter of the circular bottom is 40 mm. Further, the step height of the base 156a in the interior space of the housing 156 is 2 mm.

In FIG. 20, the side wall height of the housing 156 of the ultrasonic transmitter is made sufficiently greater than the height of the composite vibrating unit; preferable, the spacing h' between the open end edge 154a of the cone 154 of the composite vibrating unit and the open end edge 156b of the housing 156 should be set at at least one quarter of the wavelength of the output ultrasonic wave of the ultrasonic transmitter.

Figure 21A:
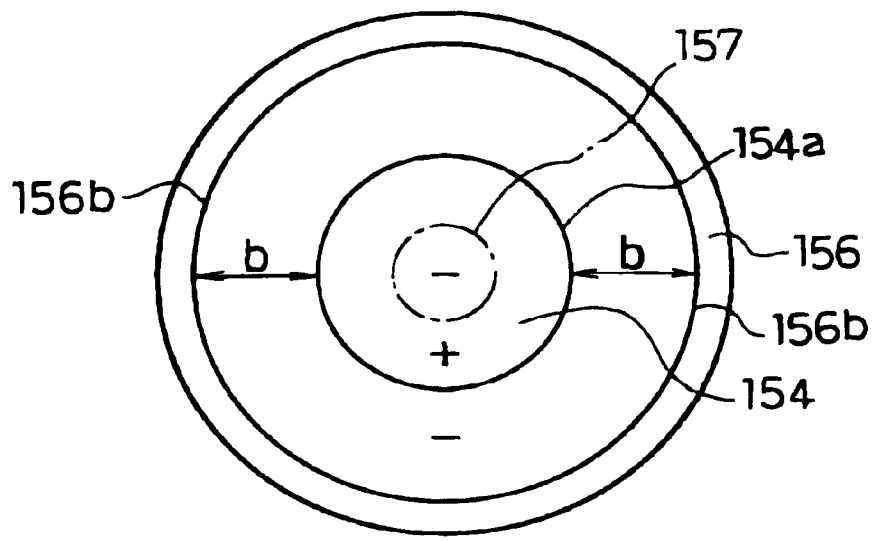
FIG. 21A is a plan view showing sound sources in the ultrasonic transmitter of FIG. 20.
Figure 21B:
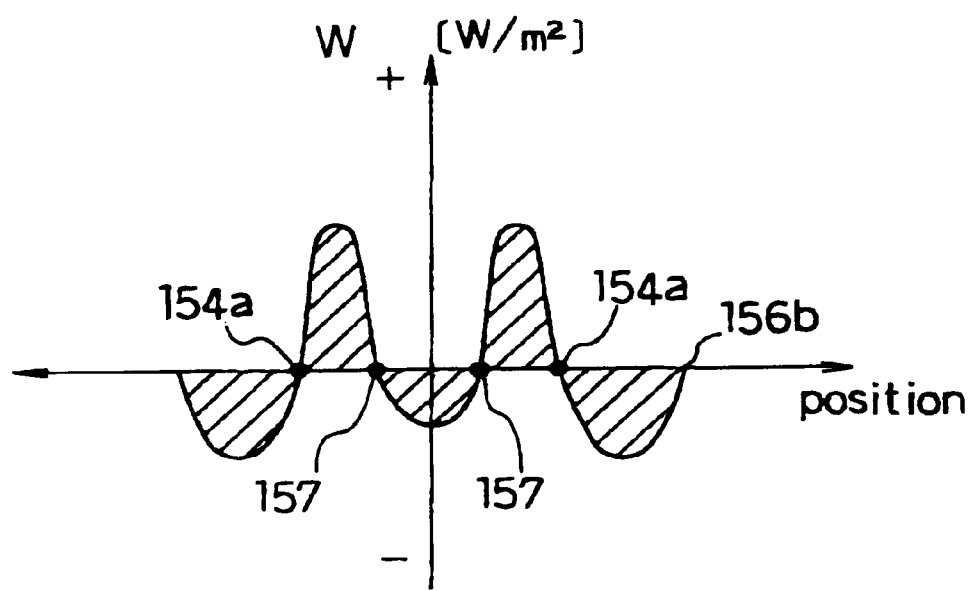
FIG. 21B is a graph showing the distribution of acoustic energy radiated from the sound sources shown in FIG. 21A.

FIG. 21A is a plan view showing sound sources in the ultrasonic transmitter of FIG. 20, and FIG. 21B is a graph showing the distribution of acoustic energy radiated from the sound sources shown in FIG. 21A. In FIG. 21B, the position of the sound sources is plotted along the abscissa and the magnitude of the acoustic energy along the ordinate In FIGS. 21A and 21B, inward displacements of the cone 154 by ultrasonic waves are taken as positive (+) and displacements in the opposite direction as negative (−).

As shown in FIG. 21B, the ultrasonic transmitter of FIG. 20 is constructed so that the acoustic energy of the ultrasonic wave radiated from the inside surface 162, including the open end edge 154a, of the cone 154 produces a vibrational displacement opposite in sign from that produced by the acoustic energy of the ultrasonic wave radiated through the gap between the open end edge 154a and the open end edge 156b of the housing 156.

Since the node 157 of vibration is generated near the middle of the cone 154, the face inside the node 157 and the face outside it vibrate with different phases.

The acoustic energy distribution shown in FIG. 21B can be varied by varying the earlier mentioned parameters b, h, and t to construct a desired sound source structure.

Further, when the cone 154 vibrates, the node 157 of vibration is generated at positions symmetrical about the center axis of the cone 154. This contributes to increasing the directivity.

The ultrasonic wave emitted from the inside surface of the cone 154 is prevented from dispersing by the presence of the ultrasonic wave of a different phase emitted through the space between the open end edge 154a of the cone 154 and the open end edge 156b of the housing 156.

The inventors of the present invention compared the ultrasonic transmitter of FIG. 20 with the conventional ultrasonic transmitter, and confirmed that the ultrasonic transmitter of FIG. 20 had a sharper, superior directivity. The inventors also confirmed that the ultrasonic transmitter of FIG. 20, when mounted with a conical-shaped horn 159, was compact in size and had excellent sharp directivity compared with the conventional ultrasonic transmitter.

It will be appreciated here that the structure of the housing for accommodating the composite vibrating unit having the bimorph vibration device 165 and the cone 154 is not limited to the one shown in the above embodiment.

Figure 22A:
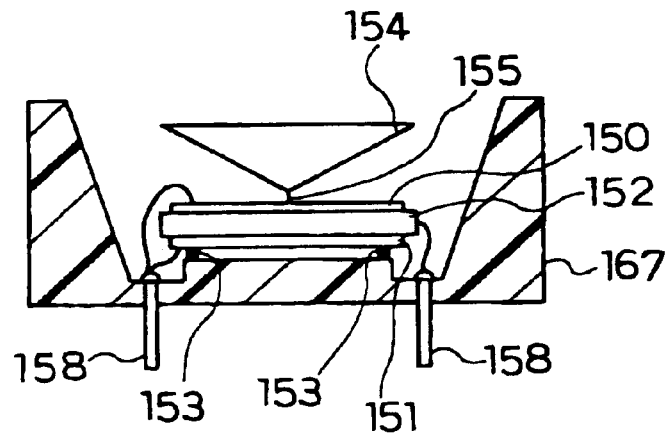
FIG. 22A is a side elevational view, in cross section, showing other examples of a housing structure for accommodating a composite vibrating unit.
Figure 22B:
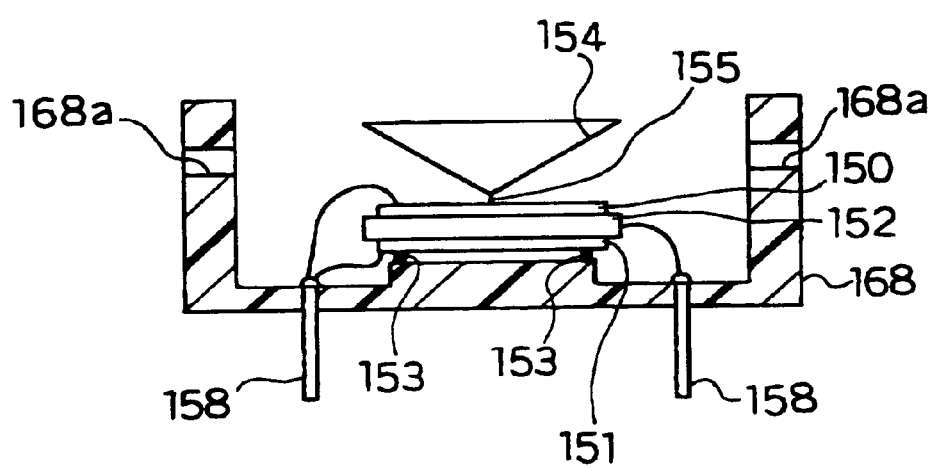
FIG. 22B is a side elevational view, in cross section, showing other examples of a housing structure for accommodating the composite vibrating unit.

FIGS. 22A and 22B are side elevational views, in cross section, showing other examples of the housing structure for accommodating the composite vibrating unit. The ultrasonic transmitter shown in FIG. 22A is constructed using a housing 167 having on the inside surface thereof an acoustic reflection face inclined at an angle relative to the center axis of the cone 154. The ultrasonic transmitter shown in FIG. 22B has a housing 168 having holes 168a opened through its side walls. When the ultrasonic transmitter of FIG. 22B is mounted with the center axis of the cone 54 extending in the horizontal direction, the holes 168a act to drain water such as rain drops.

In the sixth embodiment, the piezoelectric vibrator has been described by using a bimorph vibration device, but it will be appreciated that similar effects to those achieved in the sixth embodiment can be obtained if the drip-proof and dust-proof unimorph vibration device described in the fourth embodiment is used.

In the sixth embodiment, the sound source structure of the ultrasonic transmitter has been described in which the ultrasonic energy distribution is opposite in sign between the ultrasonic wave radiated from the conical surface, including the open end edge 154a, of the cone 154 and that radiated through the gap between the open end edge 154a of the cone 154 and the throat 159b of the horn 159. However, as an alternative example, when the ultrasonic transmitter is constructed so that the ultrasonic energies radiated from the two sources are both distributed in the positive region, which is equivalent to increasing the sound source size, the directivity becomes sharper and the sound-pressure output increases compared with the conventional ultrasonic transmitter.

As described above, according to the ultrasonic transmitter of the sixth embodiment, ultrasonic waves of different phases can be output by setting the distance between the open end edge 154a of the cone 154 and the throat 159b of the horn 159, and the distance between the open end edge 154a of the cone 154 and the mouth 159a of the horn 159, at predetermined values. By so doing, the ultrasonic waves emitted from the sound sources of the sixth embodiment exhibit phase discontinuities in a plane perpendicular to the center axis of the cone, and the ultrasonic wave emitted from the conical surface of the cone 154 is prevented from dispersing because of the presence of the ultrasonic waves of different phases. Thus, according to the ultrasonic transmitter of the sixth embodiment, the sound-pressure directivity can be made sharper and frontal sound-pressure can thus be increased.

Embodiment 7

A seventh embodiment of the ultrasonic transmitter of the present invention will be described below with reference to accompanying drawings.

Figure 23:
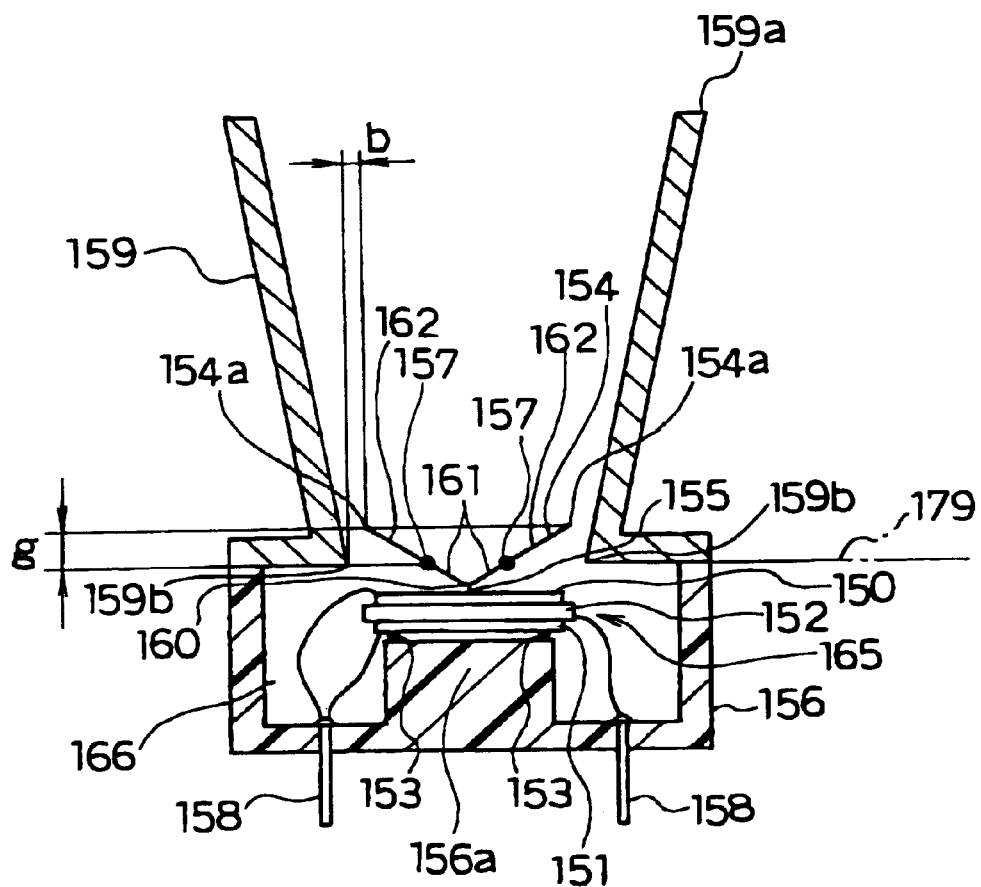
FIG. 23 is a side elevational view, in cross section, showing a construction of an ultrasonic transmitter of a seventh embodiment.

FIG. 23 is a side elevational view, in cross section, showing the construction of the ultrasonic transmitter of the seventh embodiment. In FIG. 23, those parts which are substantially the same in function and construction as the corresponding parts in the foregoing sixth embodiment are designated by the same reference numerals as those used in the sixth embodiment. In FIG. 23, the piezoelectric vibrator 165 consists of a vibrating plate 152 made of a metal such as stainless steel and piezoelectric discs 150 and 151 bonded to opposite faces of the vibrating plate 152. The piezoelectric disc 151 is attached fixedly to a housing 156 by means of an elastic member 153 which is a soft adhesive, and the piezoelectric vibrator 165 is elastically supported on a base 156a of the housing 156 via the elastic member 153. A cone 154 of a conical structure is mounted on the other piezoelectric disc 150, and a terminal pin 155 for connecting the cone 154 is provided on the vibrating plate 152.

As shown in FIG. 23, terminal pins 158 for applying a voltage to the piezoelectric discs 150, 151 and vibrating plate 152 are provided passing through the housing 156. When a voltage is applied to the terminal pins 158, the piezoelectric vibrator vibrates with deflection, and a node 157 of vibration is generated on the cone 154. A conical-shaped horn 159 having a flared end is mounted on the housing 156 in which the composite vibrating unit having the piezoelectric vibrator and the cone 154 is placed.

In FIG. 23, mark g indicates the spacing, in the direction parallel to the center axis of the conical-shaped horn 159, between an open end edge 154a of the cone 154 and the throat 159b of the horn 159.

In the seventh embodiment, the composite vibrating unit having the cone 154 and the piezoelectric vibrator 165 as a bimorph vibration device is mounted on the base 156a by maintaining the above positional relationship.

The ultrasonic transmitter of the seventh embodiment is a variant form of the ultrasonic transmitter of the foregoing sixth embodiment, in that the spacing g along the direction of the center axis is varied among various values.

Figure 24:
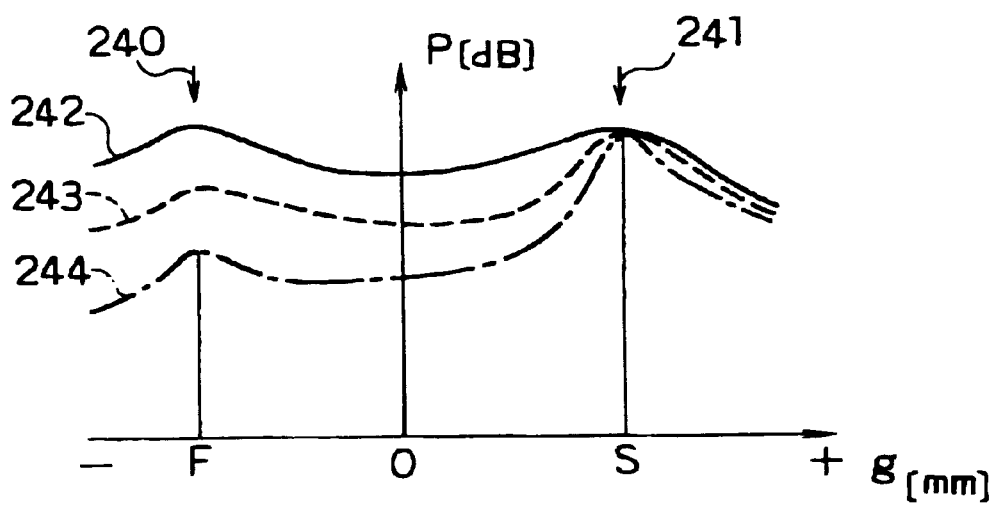
FIG. 24 is a graph showing the relationship between sound-pressure output and a spacing g along a direction of the axis between an open end edge and a throat in the ultrasonic transmitter.

FIG. 24 is a graph showing the relationship between the sound-pressure output and the spacing g along the direction of the axis between the open end edge 154a and the throat 159b in the ultrasonic transmitter. In FIG. 24, the spacing g is plotted along the abscissa, which is zero when the open end edge 154a of the cone 154 and the throat 159b of the horn 159 are both located in the same plane perpendicular to the direction of the height in FIG. 23, and positive when the open end edge 154a of the cone 154 is located inside the horn 159. Plotted along the ordinate is the sound-pressure value [dB].

Three curves 242, 243, and 244 shown in FIG. 24 are plotted by varying the spacing b between the open end edge 154a of the cone 154 and the throat 159b of the horn 159 in the direction perpendicular to the center axis of the horn 159. The curve 242 (solid line) is for the case where the spacing b is set at one quarter of the wavelength of the ultrasonic wave outputting from the ultrasonic transmitter. The curve 243 (dashed line) shows the characteristic of the ultrasonic transmitter when the spacing b is set narrower than that for the ultrasonic transmitter exhibiting the characteristic shown by the curve 242, and the curve 244 (alternate long and short dash line) shows the characteristic of the ultrasonic transmitter when the spacing b is set narrower than that for the ultrasonic transmitter exhibiting the characteristic shown by the curve 243 (dashed line).

In FIG. 24, a maximum value indicated by arrow 240 is a first sound-pressure maximum value, and a maximum value indicated by arrow 241 is a second sound-pressure maximum value.

In the ultrasonic transmitter of the seventh embodiment, the first sound-pressure maximum value was attained when the composite vibrating unit having the cone 154 and the bimorph vibration device as the piezoelectric vibrator was placed so that the spacing g was at position F, and the second sound-pressure maximum value was attained when the composite vibrating unit was moved upward to bring the spacing g to position S. As can be seen from FIG. 24, in the ultrasonic transmitter of the seventh embodiment, the second sound-pressure maximum value is substantially the same regardless of the spacing 72b. The position S is where the vibration node 157 of the cone 154 and the throat 159b of the horn 159 are positioned in the same plane perpendicular to the center axis.

As is apparent from the above description, in the seventh embodiment shown in FIG. 23, it is desirable that the conical face 161 lower than the vibration node 157 of the cone 154 and including the conical vertex 160 be positioned in the space lower than the plane 179 perpendicular to the center axis and containing the throat 159b of the horn 159. That space corresponds to the space 166 where the bimorph vibration device is placed. In other words, when the conical face 162 bounded below by the vibration node 157 of the cone 154 and including the open end edge 154a is positioned inside the horn 159, the ultrasonic transmitter of the seventh embodiment produces a large and stable ultrasonic output.

In the seventh embodiment, when the vibration node 157 of the cone 154 and the throat 159b of the horn 159 are positioned in the same plane perpendicular to the center axis, the ultrasonic waves of different phases generated by the vibrations of the two conical faces 161 and 162 of the cone 154 are spatially separated and prevented from interfering with each other.

Further, when the ultrasonic transmitter is constructed as just described, the sound-pressure of ultrasonic wave radiated through the space between the open end edge 154a of the cone 154 and the throat 159b of the horn 159 becomes extremely small.

Figure 25A:
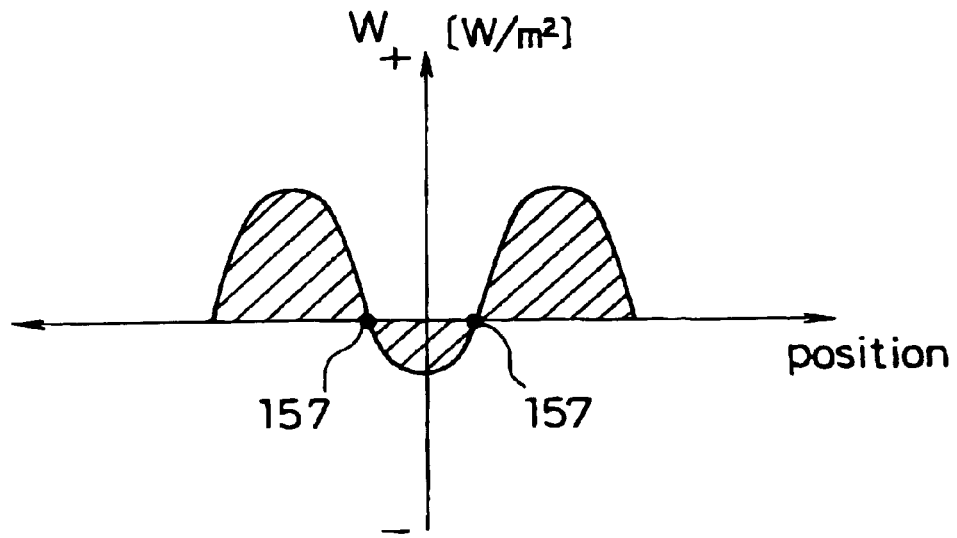
FIG. 25A is a graph showing a distribution of acoustic energy radiated from various sound sources in the conventional ultrasonic transmitter of FIG. 38.
Figure 25B:
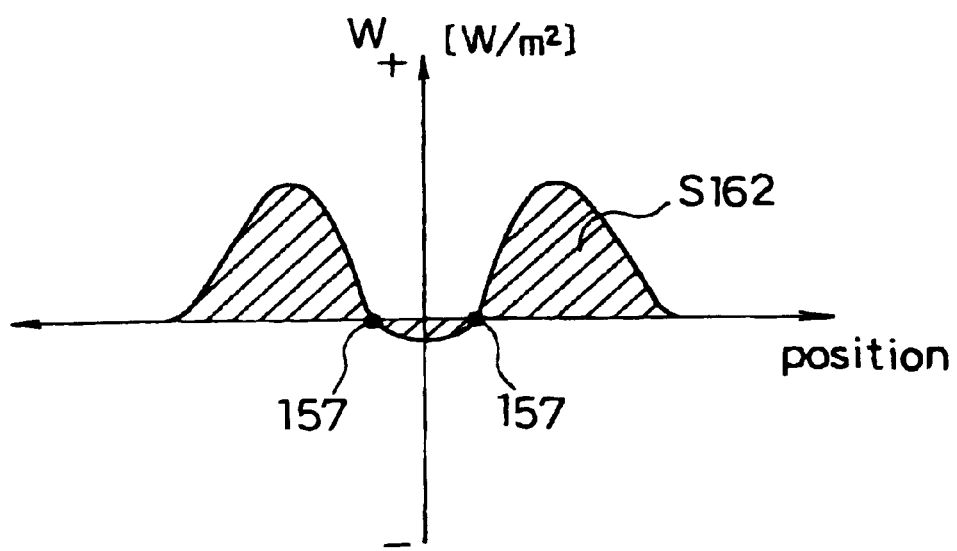
FIG. 25B is a graph showing a distribution of acoustic energy radiated from various sound sources in the ultrasonic transmitter of the seventh embodiment.

FIG. 25A is a graph showing the distribution of acoustic energy radiated from the various sound sources in the conventional ultrasonic transmitter of FIG. 38, and FIG. 25B is a graph showing the distribution of acoustic energy radiated from the various sound sources in the ultrasonic transmitter of the seventh embodiment. In FIGS. 25A and 25B, the position of the sound sources is plotted along the abscissa and the magnitude of the acoustic energy along the ordinate. Here, ultrasonic waves propagating inside the horn 159 in the direction of the mouth 159a are taken positive (+).

As shown in FIG. 25B, the distribution profile of the acoustic energy in the positive region is greatly increased in the ultrasonic transmitter of the seventh embodiment compared with that of the conventional ultrasonic transmitter. As a result, according to the ultrasonic transmitter of the seventh embodiment, the directivity of sound-pressure can be increased, increasing the frontal sound-pressure.

As described above, in the ultrasonic transmitter of the seventh embodiment, the vibration node 157 of the cone 154 and the throat 159b of the horn 159 are positioned in the same plane, and the spacing between the vibration node 157 of the cone 154 and the throat 159b of the horn 159, in the direction parallel to the center axis, is set at not less than one quarter of the wavelength of the output ultrasonic wave. With this construction, the ultrasonic transmitter of the seventh embodiment produces an ultrasonic wave output S162 whose acoustic energy has a wide distribution profile by the vibration of the upper conical face 162 including the open end edge 154a and bounded below by the vibration node 157 of the cone 154.

With the above-described construction in which the vibration node 157 and the throat 159b are positioned in the same plane, the ultrasonic transmitter of the seventh embodiment achieves an increase in ultrasonic sound-pressure output and provides sharp directivity.

Embodiment 8

An eighth embodiment of the ultrasonic transmitter of the present invention will be described below with reference to accompanying drawings.

Figure 26:
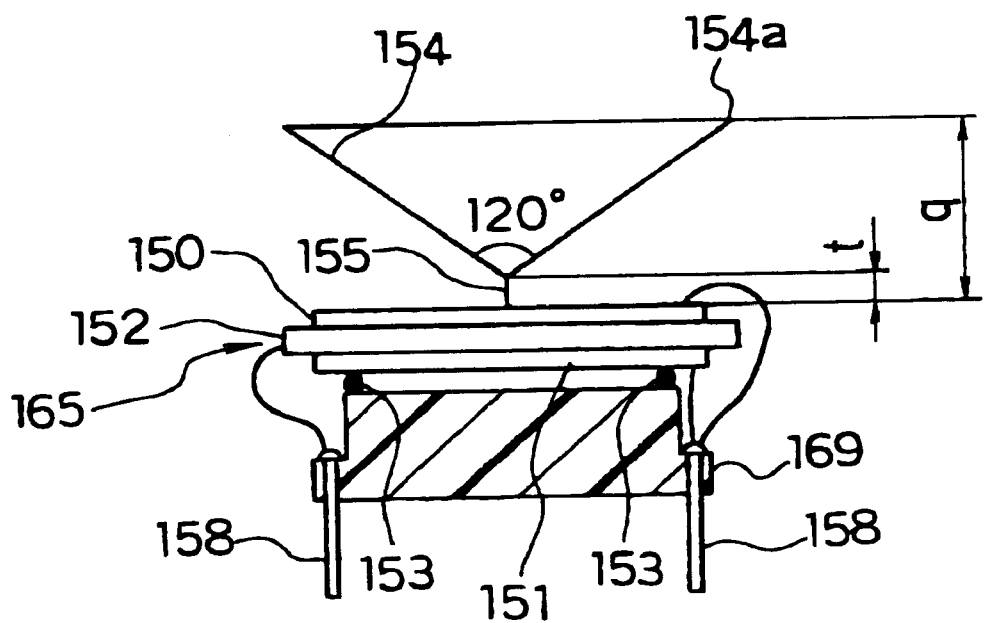
FIG. 26 is a side elevational view, in cross section, showing a construction of an ultrasonic transmitter of an eighth embodiment.

FIG. 26 is a side elevational view, in cross section, showing the construction of the ultrasonic transmitter of the eighth embodiment. In FIG. 26, those parts which are substantially the same in function and construction as the corresponding parts in the foregoing seventh embodiment are designated by the same reference numerals as those used in the seventh embodiment. In FIG. 26, the piezoelectric vibrator 165 comprises a vibrating plate 152 made of a metal such as stainless steel and piezoelectric discs 150, 151 bonded to opposite faces of the vibrating plate 152. An elastic member 153, a soft adhesive, is fixedly attached to the piezoelectric disc 151, and the piezoelectric vibrator 165 is elastically supported on a base 169 via the elastic member 153. A cone 154 of a conical structure is mounted on the other piezoelectric disc 150, and a rod 155 for connecting the cone 154 is provided on the vibrating plate 152.

As shown in FIG. 26, terminal pins 158 for applying a voltage to the piezoelectric discs 150, 151 and vibrating plate 152 are provided passing through the base 169.

The piezoelectric discs 150, 151 attached to opposite faces of the vibrating plate 152 are annular discs each having a hole opened through the center thereof, and electrodes are formed on all principal faces (the upper and lower faces in FIG. 26) of the piezoelectric discs 150, 151. The piezoelectric discs 150, 151 sandwiching the vibrating plate 152 between them are arranged in such a manner that their polarizations become equal in direction and magnitude. The piezoelectric discs 150 and 151 and the vibrating plate 152 together constitute the piezoelectric vibrator 165 which is a bimorph vibration device.

The cone 154 is a conical-shaped hollow vibrator made of a light metal such as aluminum. One end of the rod 155 is connected to the center of the vibrating plate 152, and the other end is connected to the conical vertex of the cone 154. In this way, the piezoelectric vibrator as the bimorph vibration device and the cone 154 are mechanically connected together at their respective centers.

The composite vibrating unit having the bimorph vibration device and the cone 154 is elastically supported on the base 169 via the elastic member 153 at the node of deflective vibration of the bimorph vibration device.

In FIG. 26, mark t indicates the length of the rod 155 along the direction of the center axis of the cone 154, and q denotes the distance along the same center axis from the open end edge 154a of the cone 154 to the bimorph vibrator.

Next, the propagation of the ultrasonic waves output from the ultrasonic transmitter of the eighth embodiment will be described below.

Figure 27:
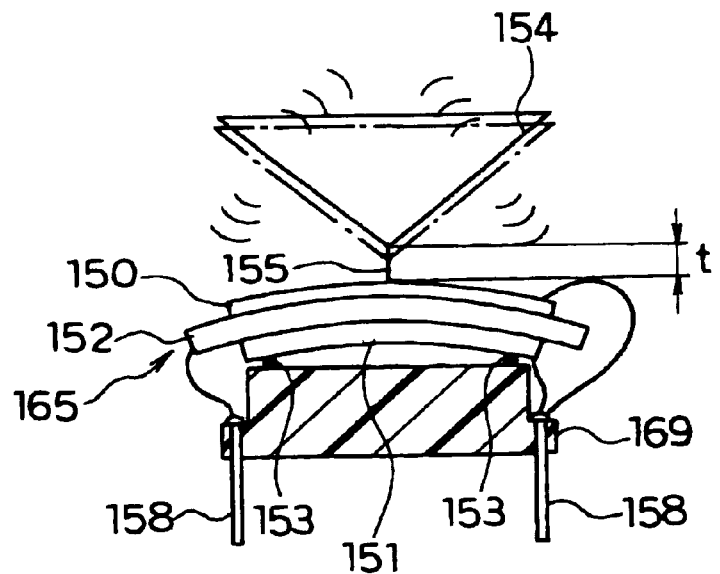
FIG. 27 is a side view showing the ultrasonic transmitter of the eighth embodiment in a condition of a vibrational displacement.

FIG. 27 is a side view showing the ultrasonic transmitter of the eighth embodiment in the condition of a vibrational displacement. In FIG. 27, an alternate long and short dash line shows the condition of the ultrasonic transmitter before vibrating the cone 154, and a solid line shows the condition when the cone 154 is displaced by vibration.

As shown in FIG. 27, when the conical surface of the cone 154 vibrates, an ultrasonic wave is emitted from the inside conical surface of the cone 154. At the same time, an ultrasonic wave opposite in phase from the ultrasonic wave emitted from the inside surface is emitted from the outside conical surface of the cone 154. More specifically, an ultrasonic wave opposite in phase from the ultrasonic wave emitted from the inside surface is radiated from the back surface of the cone 154 toward the bimorph vibration device. The ultrasonic wave radiated from the back surface of the cone 154 toward the bimorph vibration device is reflected at the bimorph vibration device and propagate toward the front of the cone 154.

As a result, two ultrasonic waves of different phases are output forward of the cone 154 (in the upward direction in FIG. 27) by the vibration of the cone 154. The two ultrasonic waves of different phases propagate while interfering each other, and the sound-pressure and directivity forward of the cone 154 are thus determined.

The phase of the ultrasonic wave reflected at the bimorph vibration device is determined by the distance that the ultrasonic wave has propagated since it was output from the back conical surface of the cone 154. Therefore, the phase of the ultrasonic wave can be varied by varying the length t of the rod 155 at the joint between the bimorph vibration device and the cone 154 and thereby varying the propagation distance of the ultrasonic wave.

The sound-pressure and directivity forward of the cone 154 are determined by the way the two ultrasonic waves interfere with each other. Further, to obtain a maximum value and sharp directivity of sound-pressure output, the length t of the rod 155 and the distance q between the open end 154a and the bimorph vibration device along the direction of the center axis of the cone 154 need to be set at specified values.

The phase of the ultrasonic wave reflected at the bimorph vibration device is related to the wavelength of the output ultrasonic wave. Accordingly, the length t of the rod 155 that should be set to the appropriate value to obtain a maximum value and sharp directivity of sound-pressure output has a periodicity that is dependent on the wavelength of the output ultrasonic wave.

Figure 28:
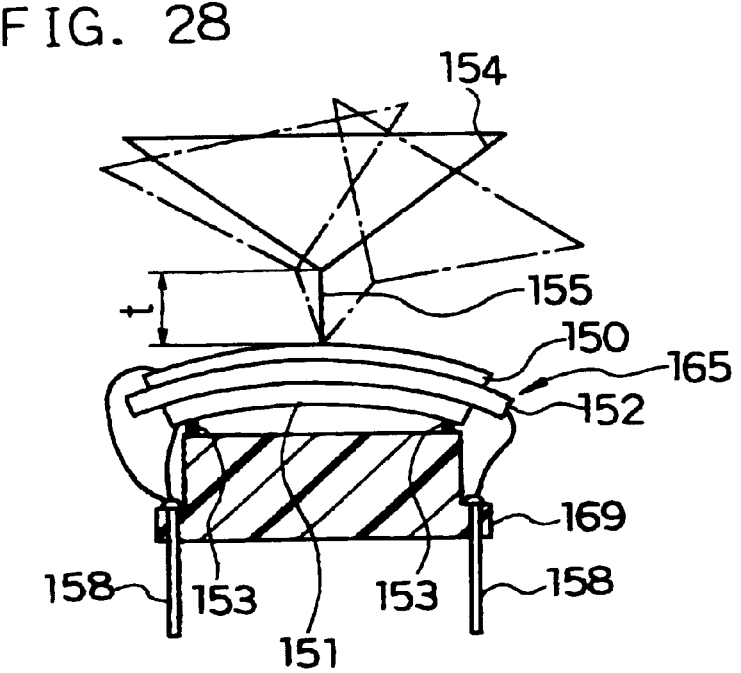
FIG. 28 is a side view conceptually illustrating a condition of a vibrational displacement of the ultrasonic transmitter when the length t of the rod is made large.

FIG. 28 is a side view conceptually illustrating the condition of a vibrational displacement of the ultrasonic transmitter when the length t of the rod 155 is made large. In FIG. 28, solid lines show the condition before the cone 154 is displaced by vibration, and alternate long and short dash lines indicate the condition when the cone 154 is displaced by vibration.

As shown in FIG. 28, when the length t of the rod 155 is made large, the cone 154 wobbles about the base of the rod 155 with the vibration of the bimorph vibration device. This wobbling motion amplifies vibrational displacements other than the vibrational displacements in directions parallel to the center axis of the cone 154. Vibrations accompanying such wobbling impair sound-pressure output. Therefore, increasing the length t of the rod 155 results in a drop in sound-pressure output due to unwanted vibrations.

As described above, the sound-pressure in the direction of the center axis of the cone 154 of the ultrasonic transmitter varies with the length t of the rod 155, and has a periodicity that is dependent on the wavelength of the output ultrasonic wave.

Figure 29:
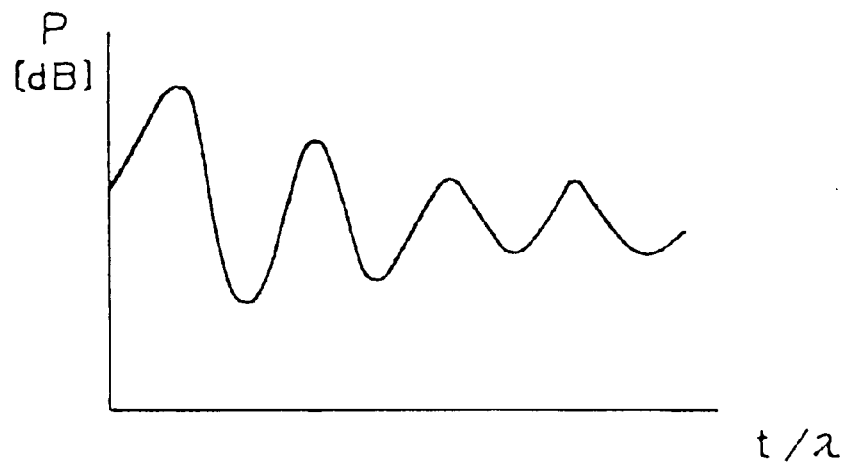
FIG. 29 is a graph showing a relationship of sound-pressure in a direction of a center axis of a cone, with respect to length t of a rod and wavelength ($\lambda$) of output ultrasonic wave of the ultrasonic transmitter.

FIG. 29 is a graph showing the relationship of the sound-pressure in the direction of the center axis of the cone 154, with respect to the length t of the rod 155 and the wavelength ($\lambda$) of the output ultrasonic wave of the ultrasonic transmitter. In FIG. 29, the length t of the rod 155 divided by the wavelength ($\lambda$) of the output ultrasonic wave is plotted along the abscissa, and the sound-pressure in the direction of the center axis of the cone 154 of the ultrasonic transmitter is plotted along the ordinate.

As can be seen from FIG. 29, the sound-pressure output can be maximized by setting the length t of the rod 155 to a certain value for a predetermined output ultrasonic wave, and sharp directivity can be achieved using the construction of the eighth embodiment.

The value of the length t of the rod 155 necessary to achieve the maximum sound-pressure greatly depends on the structure of the cone 154 such as the size of the conical surface of the cone 154 and the spreading angle of the cone 154.

Next, a specific example of how the value of the length t of the rod 155 is set will be described with reference to FIG. 26. In order to obtain a large output, the component of the ultrasonic wave reflected and radiated forward after being output from the back surface of the cone 154 must be in phase with the component of the ultrasonic wave radiated forward of the cone 154. A requirement for this is to set the distance q between the open end edge 154a of the cone 154 and the piezoelectric disc 150 at an integral multiple of the wavelength of the output ultrasonic wave. Also, the frequency of the output ultrasonic wave was 40 kHz, the conical center angle of the cone 154 was 120 degrees, the diameter of the open end edge 154a of the conical base of the cone 154 was 20 mm, and the conical height of the cone 154 (q–t in FIG. 26) was about 5.8 mm. In this case, the wavelength of the 40 kHz ultrasonic wave is about 8.5 mm. Therefore, the smallest length of the rod 155 is about 2.7 mm that satisfies the requirement that the distance q be set at an integral multiple of the wavelength of the output ultrasonic wave (the requirement that t+5.8 be equal to an integral multiple of 8.5). With this construction, the sound output pressure is at a maximum value in FIG. 30.

When the ultrasonic transmitter of the eighth embodiment is constructed so that the cone 154 has a node 157 of vibration 157 as in the foregoing embodiment, the sound-pressure output can be further increased.

Further, the piezoelectric vibrator in the eighth embodiment can be constructed in a drip-proof structure such as the one described in the explanation of the ultrasonic vibrator in the fourth embodiment.

As described above, according to the eighth embodiment, by adjusting the length of the joint between the bimorph vibration device and the cone 154 to a value appropriate to the wavelength of the output ultrasonic wave, a large sound-pressure output and sharp directivity can be achieved.

Embodiment 9

A ninth embodiment of the ultrasonic transmitter of the present invention will be described below with reference to FIGS. 30 to 33.

Figure 30:
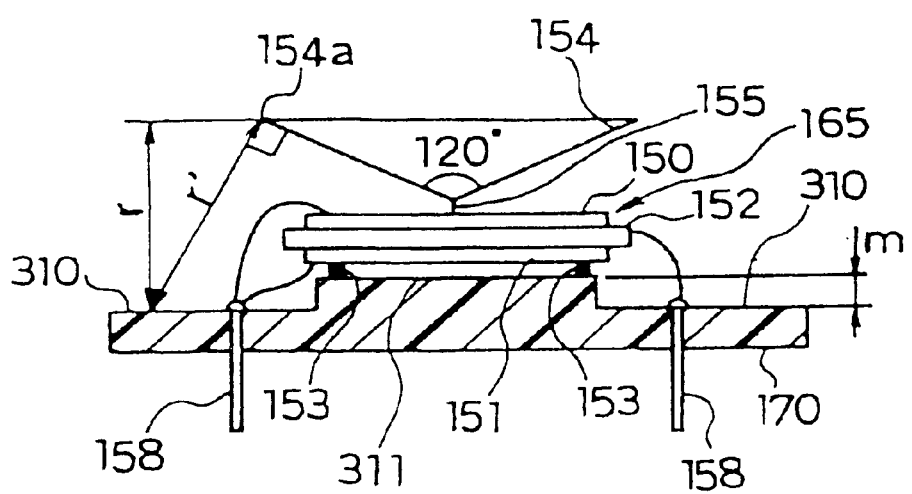
FIG. 30 is a side elevational view, in cross section, showing a construction of an ultrasonic transmitter of a ninth embodiment.

FIG. 30 is a side elevational view, in cross section, showing the construction of the ultrasonic transmitter of the ninth embodiment. In FIG. 30, those parts which are substantially the same in function and construction as the corresponding parts in the foregoing eighth embodiment are designated by the same reference numerals as those used in the eighth embodiment. In FIG. 30, the piezoelectric vibrator 165 comprises of a vibrating plate 152 made of a metal such as stainless steel and piezoelectric discs 150, 151 bonded to opposite sides of the vibrating plate 152. An elastic member 153, a soft adhesive, is fixedly attached to the piezoelectric disc 151, and the piezoelectric vibrator 165 is elastically supported on a base 170 via the elastic member 153. A cone 154 of a conical structure is mounted on the other piezoelectric disc 150, and a rod 155 for connecting the cone 154 is provided on the vibrating plate 152.

As shown in FIG. 30, terminal pins 158 for applying a voltage to the piezoelectric discs 150, 151 and vibrating plate 152 are provided passing through the base 170.

In FIG. 30, a reference numeral r indicates the distance from the open end edge 154a of the cone 154 to a lower step face 310 of the base 170 in the direction parallel to the center axis of the cone 154. A reference numeral r' is the distance from the open end edge 154a to the lower step face 310 of the base 170 in the direction perpendicular to the conical surface of the cone 154. A reference numeral m is the distance, forming a step, from an upper step face 311 of the base 170 to the lower step face 310 of the base 170 in the direction parallel to the center axis of the cone 154.

The construction and operation of the ultrasonic transmitter of the ninth embodiment are the same as those of the ultrasonic transmitter of the aforementioned eighth embodiment.

As described above, in the ultrasonic transmitter of the ninth embodiment, the base 170 has the step m, and the upper step face 311 of the base 170 elastically supports thereon the composite vibrating unit via the elastic member 153, a soft adhesive, at the node of deflective vibration of the bimorph vibration device.

Further, as shown in FIG. 30, in the ninth embodiment the lower step face 310 of the base 170 is formed extending outwardly beyond the point where the line extended from the open end edge 154a of the cone 154 in the direction perpendicular to the conical surface intersects the lower step face 310 of the base 170.

Next, the propagation of the ultrasonic waves output from the ultrasonic transmitter of the ninth embodiment will be described below.

As in the ultrasonic transmitter of the foregoing eighth embodiment, when the cone 154 vibrates an ultrasonic wave is output from the inside conical surface of the cone 154 toward the front of the cone 154 and, at the same time, an ultrasonic wave is output from the back surface of the cone 154 toward the bimorph vibration device. The ultrasonic wave emitted rearward of the cone 154 is opposite in phase from the ultrasonic wave emitted toward the front of the cone 154.

The ultrasonic wave emitted rearward from the cone 154 toward the bimorph vibration device is reflected at the bimorph vibration device, as in the foregoing eighth embodiment, and also at the lower step face 310 of the base 170. The reflected ultrasonic wave from the lower step face 310 of the base 170 is radiated forwardly of the cone 154 as an ultrasonic wave having a different phase from the phase of the ultrasonic wave radiated from the inside conical surface of the cone 154.

Accordingly, the sound-pressure and directivity of the ultrasonic wave output from the ultrasonic transmitter of the ninth embodiment are determined by the interference of the ultrasonic waves having different phases, as previously described. The phase of the ultrasonic wave reflected at the lower step face 310 of the base 170 varies according to the propagation distance from the conical surface of the cone 154 to the lower step face 310 of the base 170, for example, the distance r'. Therefore, if the geometry of the composite vibrating unit is the same, since the propagation distance changes with the height of the step m of the base 170, the phase of the ultrasonic wave reflected at the lower step face 310 of the base 170 can be varied by varying that height.

When the phase of the reflected wave from the lower step face 310 of the base 170 is set so that the reflected wave and the ultrasonic wave emitted forward from the inside conical surface of the cone 154 reinforce each other, large sound-pressure and sharp directivity can be achieved for the ultrasonic transmitter of the ninth embodiment.

Figure 31:
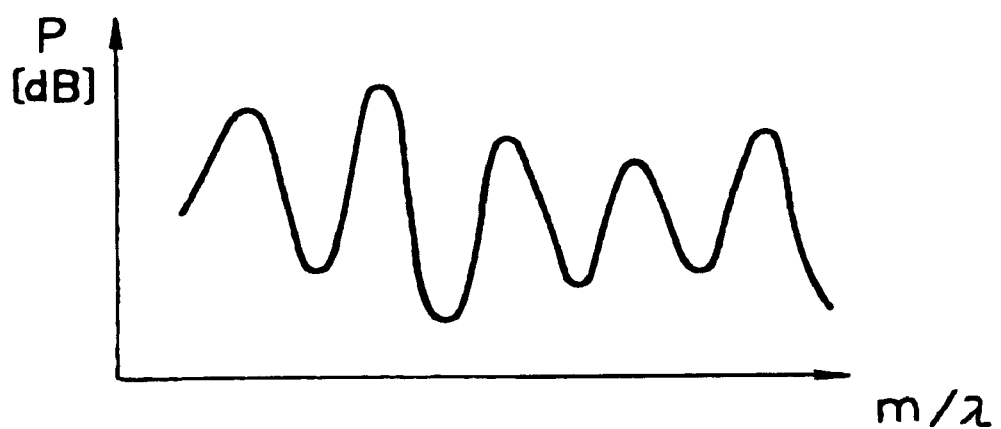
FIG. 31 is a graph showing the relationship between a step height m of the base and output sound-pressure of the ultrasonic transmitter of the ninth embodiment.

FIG. 31 is a graph showing the relationship between the step height m of the base 170 and the output sound-pressure of the ultrasonic transmitter of the ninth embodiment. In FIG. 31, the step height m divided by the wavelength ($\lambda$) of the output ultrasonic wave, i.e., m/$\lambda$, is plotted along the abscissa, and the output sound-pressure value of the ultrasonic transmitter along the ordinate. The sound-pressure value is determined by the interference between the ultrasonic waves of different phases radiated from the cone 154. Therefore, the value of the step height m exhibits a periodicity that is dependent on the wavelength of the output ultrasonic wave.

Here, the value of the step height m of the base 170 at which a sound-pressure maximum value is achieved is greatly dependent on the structure of the cone 154 such as the size of the conical surface of the cone 154 and the spreading angle of the cone.

Next, a specific example of setting the step height m will be described with reference to FIG. 30. The ultrasonic wave emitted from the back surface of the cone 154 and the ultrasonic wave reflected at the lower step face 310 of the base 170 and directed toward the front of the cone 154 must be radiated in phase into the space forward of the cone 154. In the ninth embodiment, the distance r' between the open end edge 154a of the cone 154 and the lower step face 310 of the base 170 is set at an integral multiple of the wavelength of the output ultrasonic wave. In the construction of the ninth embodiment, the distance r' along the perpendicular dropped from the lower step face 310 of the base 170 to the open end edge 154a of the cone 154 is made greatly different from the distance r between the open end edge 154a and the lower step face 310 along the direction parallel to the center axis. Therefore, in the ninth embodiment, the requirement is that the distance r' along the perpendicular be set at an integral multiple of the wavelength of the output ultrasonic wave.

As a specific example of the ultrasonic transmitter of the ninth embodiment, the frequency of the output ultrasonic wave was set at 40 kHz, the conical center angle of the cone 154 at 120 degrees, the diameter of the open end edge of the conical base of the cone 154 at 20 mm, the conical height of the cone 154 at about 5.8 mm, and the length t of the rod 155 at 2.7 mm. If the combined thickness of the piezoelectric discs 150, 151 and vibrating plate 152 is 3.4 mm, then r is equal to (5.8+2.7+3.4+m). In this case, the wavelength of the 40-kHz ultrasonic wave is about 8.5 mm. Accordingly, the smallest value of the step height m is about 3 mm that satisfies the above requirement (the requirement that 1.155× (11.9+m)=r' be equal to an integral multiple of 8.5).

Figure 32:
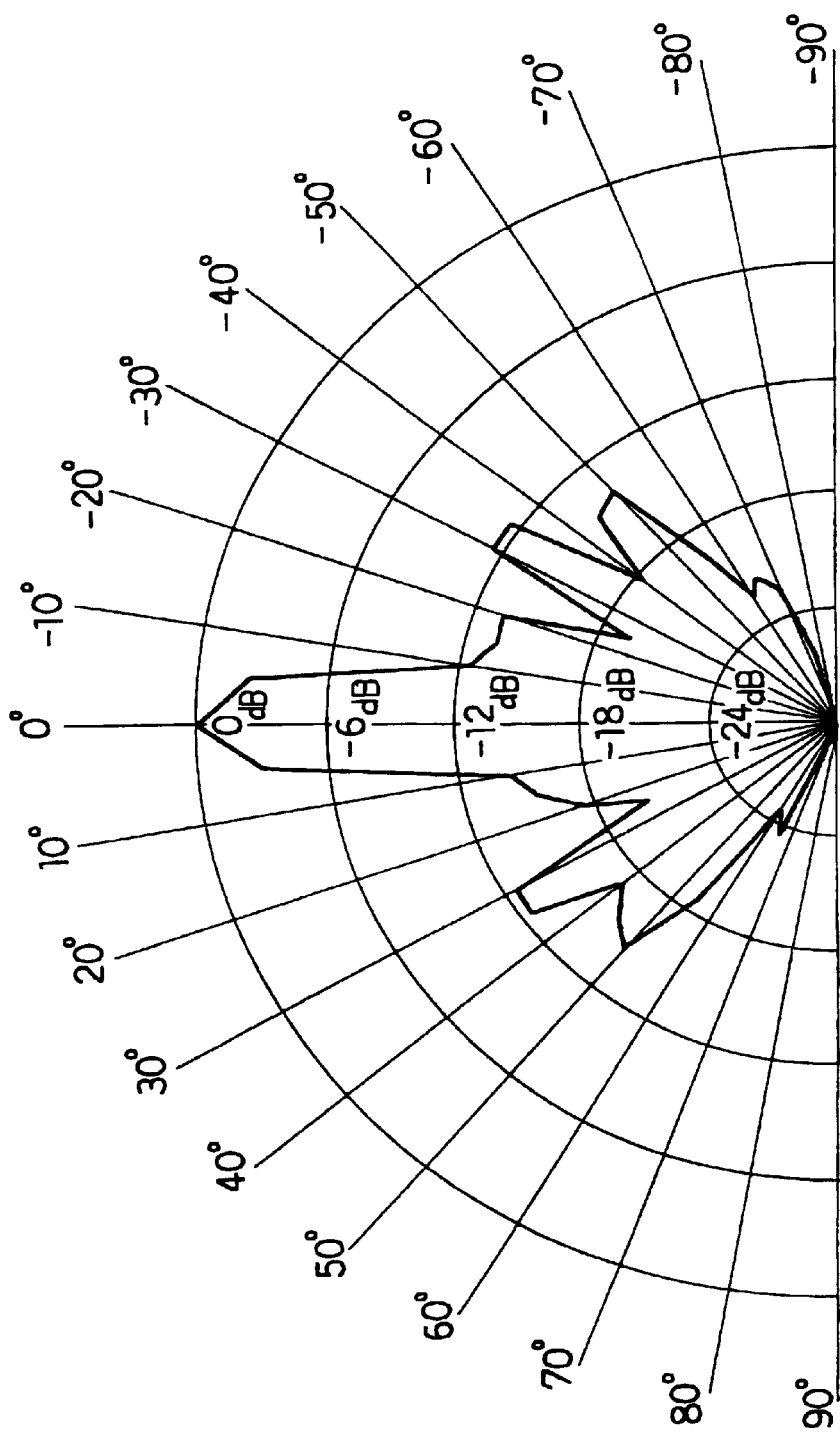
FIG. 32 shows actually measured data showing sound-pressure directivity characteristics when the same composite vibrating unit having a bimorph vibration device and a cone was mounted on different bases identical in the size of a lower step face but differing in a step height m.
Figure 33:
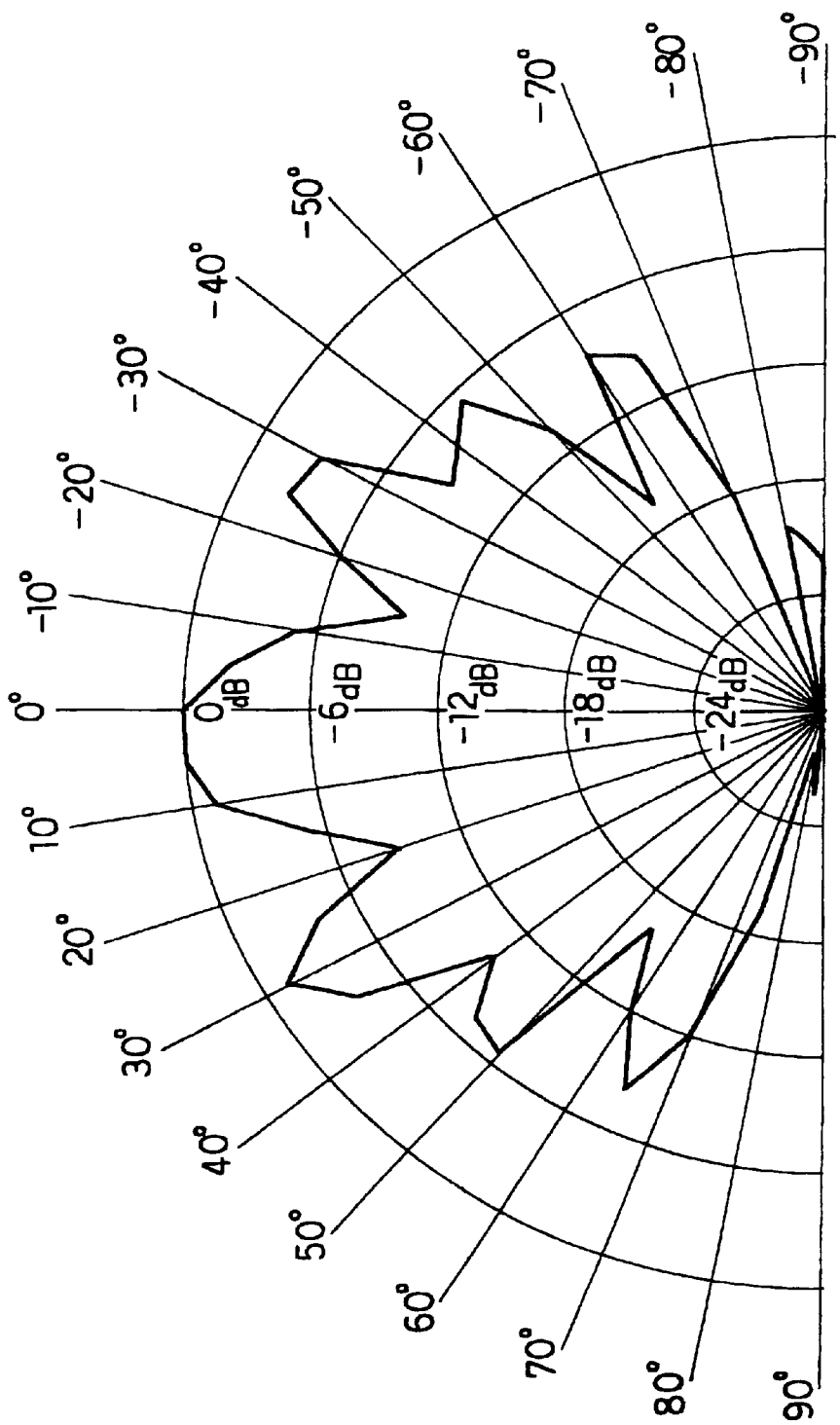
FIG. 33 shows actually measured data showing sound-pressure directivity characteristics when the same composite vibrating unit having a bimorph vibration device and a cone was mounted on different bases identical in the size of the lower step face 310 but differing in the step height m.

FIGS. 32 and 33 show actually measured data showing sound-pressure directivity characteristics when the same composite vibrating unit having the bimorph vibration device and the cone 154 was mounted on different bases 170 identical in the size of the lower step face 310 but differing in the step height m. The step height m of the ultrasonic transmitter of FIG. 32 is made greater than the step height m of the ultrasonic transmitter of FIG. 33.

Shown in FIGS. 32 and 33 are polar coordinates representing the relationship between the angle of the composite vibrating unit relative to the center axis and the sound-pressure output at that angle. It can be seen that the sound-pressure half angle and side lobe are smaller and the directivity is sharper in FIG. 32 than in FIG. 33. Further, the ultrasonic transmitter of FIG. 32 achieves a greater frontal sound-pressure than the ultrasonic transmitter of FIG. 33.

The lower step face 310 of the plate-like base 170 shown in the ninth embodiment, which acts as a reflector for the ultrasonic wave emitted from the cone 154, need not necessarily be formed as a flat surface, but may be formed, for example, as a curved surface having a curvature that matches the conical shape of the cone 154.

When the ultrasonic transmitter of the ninth embodiment is constructed so that the cone 154 has a node 157 of vibration as in the foregoing embodiment, the sound-pressure output can be further increased.

Further, the piezoelectric vibrator in the ninth embodiment can be constructed in a drip-proof structure such as the one described in the explanation of the ultrasonic vibrator in the aforementioned fourth embodiment.

As described above, according to the ninth embodiment, by adjusting the distance between the conical surface of the cone 154 and the reflecting surface to a value appropriate to the wavelength of the output ultrasonic wave, the sound-pressure of the ultrasonic wave generated by the vibration of the cone 154 can be brought to a maximum value and sharp directivity can thus be achieved.

Potential for Utilization in Industry

An ultrasonic transmitter-receiver according to a first aspect of the present invention each has a composite vibrating unit having a piezoelectric vibrator and a cone, in which the cone has a node of vibration at positions symmetrical about its center axis due to the resonant mode of deflective vibration of the piezoelectric vibrator. As a result, in the ultrasonic transmitter-receiver of the present invention, the piezoelectric vibrator and the cone are connected together precisely at their centers of vibration, so that the cone can be made to vibrate in directions parallel to its center axis by the deflective vibration of the piezoelectric vibrator. This achieves an ultrasonic transmitter having a large sound-pressure output and an ultrasonic receiver having high sensitivity.

An ultrasonic transmitter-receiver according to a second aspect of the present invention each has a construction such that a film, as a supporting member for connecting a cone to a housing, supports the cone while applying uniform radial tension to the cone. With this construction, the ultrasonic transmitter-receiver of the present invention enables the piezoelectric vibrator and the cone to be connected together precisely at their centers of vibration, so that the cone can be made to vibrate in directions parallel to its center axis by the deflective vibration of the piezoelectric vibrator. This achieves an ultrasonic transmitter having a large sound-pressure output and an ultrasonic receiver having high sensitivity. Further, in the above ultrasonic transmitter-receiver, when the cone and the housing are connected together by means of the film, electrodes of the piezoelectric vibrator are protected from the outside environment, thus providing drip-proof and dust-proof capabilities.

In the above ultrasonic transmitter-receiver, when a monomolecular film having water repellency is formed on the inside conical surface of the cone, the cone can be provided with a drip-proof capability while causing little effect on the large sound-pressure output of the ultrasonic transmitter and on the receiving sensitivity of the ultrasonic receiver, since the corresponding increase in the cone weight can be held to a minimum and since the monomolecular film can be made to adhere to the cone with great bonding strength.

An ultrasonic transmitter-receiver according to a third aspect of the present invention each has a construction such that a portion surrounding a portion of a vibrating cylinder where a piezoelectric element is bonded is made thinner than the portion where the piezoelectric element is bonded. This construction allows the amplitude of deflective vibration of the bottom of the vibrating cylinder to be increased while retaining the drip-proof and dust-proof structure. Accordingly, an ultrasonic transmitter having a large sound-pressure output and an ultrasonic receiver having high sensitivity can be achieved.

In the ultrasonic transmitter-receiver of the present invention, the vibrating cylinder is made up of two constituent elements, a plate-like vibrating member and a cylindrically shaped member. Therefore, according to this invention, the piezoelectric element can be easily bonded to the vibrating cylinder and manufacturing costs can be reduced drastically.

An ultrasonic transmitter according to a fourth aspect of the present invention has a construction such that the open end edge of the cone is separated from the throat of the horn by a predetermined distance. Therefore, according to the present invention, a large sound-pressure output and sharp directivity can be achieved compared with the conventional ultrasonic transmitter having the same overall dimensions. Further, according to the present invention, an ultrasonic transmitter having the same sound-pressure and directivity as the conventional ultrasonic transmitter can be constructed using a smaller structure. In a construction that does not require a horn, a large sound-pressure output and sharp directivity can be achieved.

The ultrasonic transmitter of this invention has a construction in which the distance between the vibration node of the cone and the throat of the horn, in the direction parallel to the center axis of the horn, is set equal to or less than one quarter of the wavelength of the output ultrasonic wave. Therefore, according to this invention, not only the aligning accuracy of the cone with respect to the center axis of the horn in the direction perpendicular to the center axis of the horn can be relaxed, but also a large sound-pressure output and sharp directivity can be achieved using a small-size horn.

An ultrasonic transmitter according to a fifth aspect of the present invention has a construction in which the length of the joint between the piezoelectric vibrator and the cone or the distance between the reflecting plate and the cone is set according to the wavelength of the output ultrasonic wave. Accordingly, a compact ultrasonic transmitter having a large sound-pressure output can be achieved.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A vibrating member for an ultrasonic transmitter-receiver, comprising:
    a piezoelectric element having electrodes to be supplied with or outputting therefrom a signal of an ultrasonic frequency;
    a vibrating cylinder which has a cylindrical structure closed with an upper base wall at one end and opened at the other end, wherein said piezoelectric element is fixedly attached to said upper base wall and a portion surrounding a portion where said piezoelectric element is fixedly attached is formed thinner than the portion where said piezoelectric element is fixedly attached;
    a base for closing said open end of said vibrating cylinder; and
    terminals provided passing through said base and electrically connected to said electrodes of said piezoelectric element.

2. A vibrating member for an ultrasonic transmitter-receiver according to claim 1, wherein said vibrating cylinder comprises a plate-like vibrating member, to which said piezoelectric element is fixedly attached, and a cylindrically shaped cylinder member.

3. An ultrasonic transmitter-receiver comprising:
    a piezoelectric vibrating member having electrodes to be supplied with or outputting therefrom a signal of an ultrasonic frequency;
    a diaphragm having a cone of a hollow conical structure, and connected to a center of vibration of said piezoelectric vibrating member at a substantial conical vertex of said cone, said piezoelectric vibrating member and said diaphragm together constituting a composite vibrating unit, and a periphery of said cone being free as a vibrator;
    a housing, forming an opening separated by a predetermined distance from an open end edge of a conical base of said cone, accommodating therein said composite vibrating unit, and elastically supporting said piezoelectric vibrating member thereon; and
    a horn connected to said housing, said horn forming a space gradually spreading from said opening toward a distal end.

* * * * *